United States Patent
Koishi et al.

(10) Patent No.: US 7,602,462 B2
(45) Date of Patent: Oct. 13, 2009

(54) POLARIZING ELEMENT, LIQUID CRYSTAL PANEL, LIQUID CRYSTAL TELEVISION, AND LIQUID CRYSTAL DISPLAY APPARATUS

(75) Inventors: Naoki Koishi, Ibaraki (JP); Shuuji Yano, Ibaraki (JP); Kenji Yoda, Ibaraki (JP); Kentarou Kobayashi, Ibaraki (JP); Masatoshi Tomonaga, Ibaraki (JP); Naoto Ooe, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 10/587,999

(22) PCT Filed: Feb. 15, 2006

(86) PCT No.: PCT/JP2006/302614
§ 371 (c)(1),
(2), (4) Date: Jul. 1, 2008

(87) PCT Pub. No.: WO2006/090617
PCT Pub. Date: Aug. 31, 2006

(65) Prior Publication Data
US 2008/0284948 A1    Nov. 20, 2008

(30) Foreign Application Priority Data
Feb. 25, 2005    (JP) .............................. 2005-049844

(51) Int. Cl.
G02F 1/1335    (2006.01)
(52) U.S. Cl. ......................................... 349/117; 349/96

(58) Field of Classification Search .................. 349/96, 349/117
See application file for complete search history.

(56) References Cited

U.S. PATENT DOCUMENTS

| 7,006,184 B2 | 2/2006 | Mi et al. |
| 7,508,474 B2 * | 3/2009 | Kashima ..................... 349/118 |
| 2003/0193637 A1 | 10/2003 | Mi et al. |
| 2004/0156001 A1 | 8/2004 | Moriya |
| 2004/0233362 A1 | 11/2004 | Kashima |
| 2005/0062917 A1 | 3/2005 | Kashima |

FOREIGN PATENT DOCUMENTS

| JP | 11-133408 A | 5/1999 |
| JP | 2004-38148 A | 2/2004 |
| JP | 2004-240181 A | 8/2004 |
| WO | WO 2004/019085 A1 | 3/2004 |

* cited by examiner

Primary Examiner—David Nelms
Assistant Examiner—Phu Vu
(74) Attorney, Agent, or Firm—Westerman, Hattori, Daniels & Adrian, LLP.

(57) ABSTRACT

It is the object of the present invention to provide a polarizing element capable of increasing a contrast ratio in an oblique direction and reducing a color shift in an oblique direction of a liquid crystal display apparatus. A polarizing element according to the present invention includes a polarizer, a negative C plate, a positive A plate, and a positive C plate each arranged on one side of the polarizer. The positive A plate is arranged between the polarizer and the positive C plate such that a slow axis of the positive A plate is substantially perpendicular to an absorption axis of the polarizer. The positive C plate has $Rth_{PC}[590]$ of −60 nm or less.

13 Claims, 11 Drawing Sheets

POLARIZING ELEMENT, LIQUID CRYSTAL PANEL, LIQUID CRYSTAL TELEVISION, AND LIQUID CRYSTAL DISPLAY APPARATUS

TECHNICAL FIELD

The present invention relates to a polarizing element; and a liquid crystal panel, a liquid crystal television and a liquid crystal display apparatus each using the polarizing plate.

BACKGROUND ART

A liquid crystal display apparatus has attracted attention for its properties such as being thin, being lightweight, and having low power consumption, and is widely used in: portable devices such as a cellular phone and a watch; office automation (OA) devices such as a personal computer monitor and a laptop personal computer; and home appliances such as a video camera and a liquid crystal television. The use of the liquid crystal display apparatus has spread because disadvantages in that its display properties vary depending on an angle from which a screen is viewed and that the liquid crystal display apparatus cannot operate at high temperatures and very low temperatures have been overcome by technical innovations. However, wide-ranging uses have changed the property required for each use. For example, a conventional liquid crystal display apparatus has only to have viewing angle property of a contrast ratio between white/black displays of about 10 in an oblique direction. This definition derives from a contrast ratio of black ink printed on white paper of newspapers, magazines, and the like. However, the use of the liquid crystal display apparatus for a large stationary television requires a display that can be viewed well from different viewing angles because several persons view a screen at the same time. That is, a contrast ratio between white/black displays must be 20 or more, for example. A person viewing four corners of a screen of a large display without moving is comparable to a person viewing the screen from different viewing angle directions. Thus, it is important that the liquid crystal panel have uniform contrast or display without color unevenness across the entire screen. If such technical requirements are not satisfied in use for a large stationary television, a viewer may feel uncomfortable and tired.

Various retardation films are conventionally used for a liquid crystal display apparatus. For example, there is disclosed a method of improving coloring of an image varying depending on an angle seen from (also referred to as color shift in an oblique direction) by arranging a plurality of retardation films on one side of a liquid crystal cell of in-plane switching (IPS) mode (see Patent Document 1, for example). However, such a technique cannot sufficiently improve a contrast ratio in an oblique direction and a color shift in an oblique direction. As a result, display properties of the thus-obtained liquid crystal display apparatus do not satisfy the requirements for a large stationary television.

Patent Document 1: JP-A-11-133408

DISCLOSURE OF THE INVENTION

Problems to be Solved by the Invention

The present invention has been made in view of solving the above-mentioned problems, and an object of the present invention is therefore to provide a polarizing element capable of reducing light leak in black display of a liquid crystal display apparatus and eventually increasing a contrast ratio in an oblique direction and reducing a color shift in an oblique direction of a liquid crystal display apparatus.

Means for Solving the Problems

The inventors of the present invention have conducted extensive studies for solving the above-mentioned problems. As a result, the inventors of the present invention have found that the above-mentioned objects may be attained with a polarizing element described below, to thereby complete the present invention.

A polarizing element according to an embodiment of the present invention includes a polarizer, a negative C plate, a positive A plate, and a positive C plate each arranged on one side of the polarizer. The positive A plate is arranged between the polarizer and the positive C plate such that a slow axis of the positive A plate is substantially perpendicular to an absorption axis of the polarizer. The positive C plate has $Rth_{PC}[590]$ of −60 nm or less.

In one embodiment of the invention, the negative C plate has $Rth_{NC}[590]$ of 30 nm to 200 nm. In another embodiment of the invention, a sum of $Rth_{NC}[590]$ of the negative C plate and $Rth_{PC}[590]$ of the positive C plate is −150 nm to −30 nm.

In still another embodiment of the invention, the negative C plate includes a polymer film containing as a main component at least one thermoplastic resin selected from the group consisting of a cellulose-based resin, a polyamideimide-based resin, a polyether ether ketone-based resin, and a polyimide-based resin.

In still another embodiment of the invention, the positive A plate has $Re_{PA}[590]$ of 60 nm to 180 nm. In still another embodiment of the invention, the positive A plate includes a stretched film of a polymer film containing a styrene-based resin.

In still another embodiment of the invention, the positive C plate includes a solidified layer or cured layer of a liquid crystal composition containing a liquid crystal compound in homeotropic alignment.

In still another embodiment of the invention, the liquid crystal composition includes a liquid crystal compound having at least one polymerizable functional group in a part of a molecular structure.

In still another embodiment of the invention, the solidified layer or cured layer of a liquid crystal composition containing a liquid crystal compound in homeotropic alignment has a thickness of 0.6 μm to 20 μm.

According to another aspect of the invention, a liquid crystal panel is provided. The liquid crystal panel includes the above-described polarizing element and a liquid crystal cell.

In one embodiment of the invention, the liquid crystal cell includes a liquid crystal layer containing nematic liquid crystals in homogeneous alignment in the absence of an electrical field.

According to another aspect of the invention, a liquid crystal television is provided. The liquid crystal television includes the above-described liquid crystal panel.

According to still another aspect of the invention, a liquid crystal display apparatus is provided. The liquid crystal display apparatus includes the above-described liquid crystal panel.

EFFECTS OF THE INVENTION

The polarizing element of the present invention is arranged on at least one side of the liquid crystal display apparatus, to

Figure 1A:
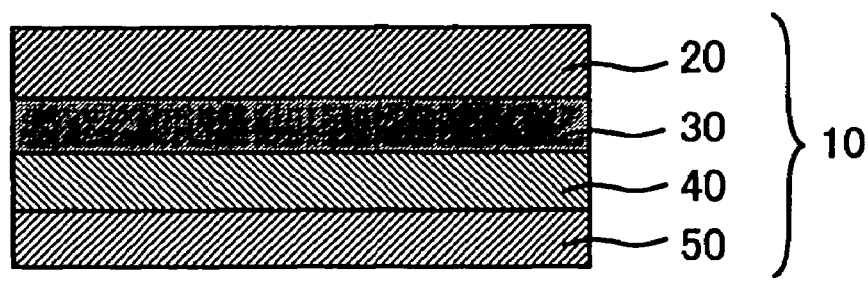
[FIG. 1(a) to 1(c)] Schematic sectional views of polarizing elements according to preferred embodiments of the present invention.

DESCRIPTION OF REFERENCE NUMERALS 10, 11, 12 Polarizing element
20 Polarizer
30 Negative C plate
40 Positive A plate
50 Positive C plate
60 Second polarizer
70 Other retardation film
100 Liquid crystal cell
101, 102 Glass substrate
103 Liquid crystal layer
110, 111 Protective layer
120, 121 Surface treated layer
130 Brightness enhancement film
140 Prism sheet
150 Liquid crystal panel
160 Light guide plate
170 Backlight
300 Feed roller
301 Polymer film
310 Aqueous iodine solution bath
320 Bath of aqueous solution containing boric acid and potassium iodide
330 Bath of aqueous solution containing potassium iodide
311, 312, 321, 322, 331, 332 Roll
340 Drying means
350 Polarizer
360 Take-up part
401 Delivery part
402 Substrate
403 Guide roll
404 First coater part
405 First drying means
406 Substrate having aligned film formed thereon
407 Second coater part
408 Second drying means
410 UV irradiation part
411 Temperature control means
412 UV lamp
414 Take-up part

BEST MODE FOR CARRYING OUT THE INVENTION

A. Overview of Polarizing Element

Figure 1B:
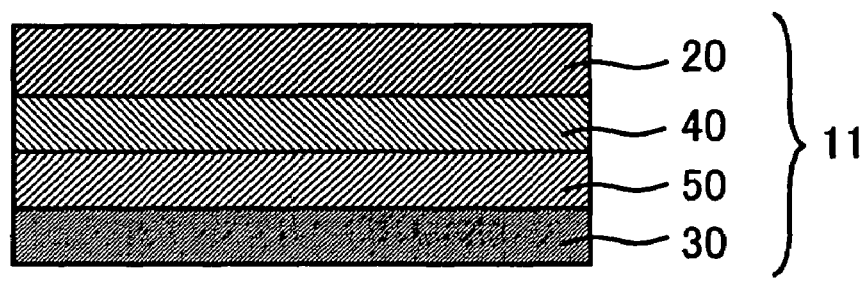
Figure 1C:
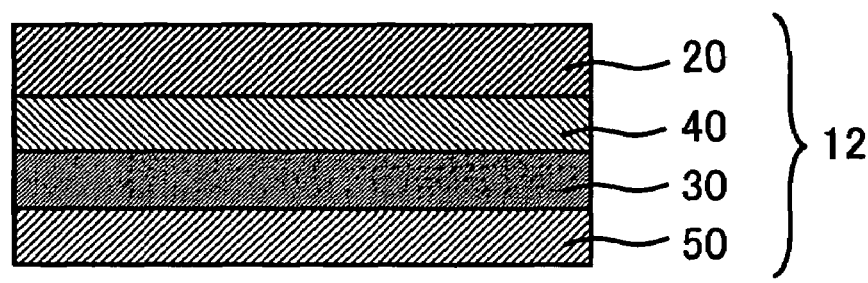
Figure 2A:
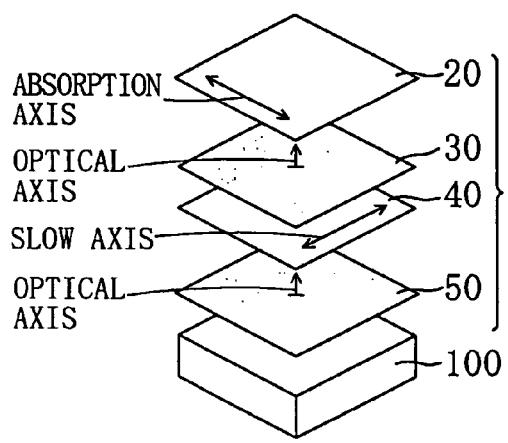
[FIG. 2(a) to 2(c)] Schematic perspective views of the polarizing elements of FIGS. 1(a) to 1(c), respectively.
Figure 2B:
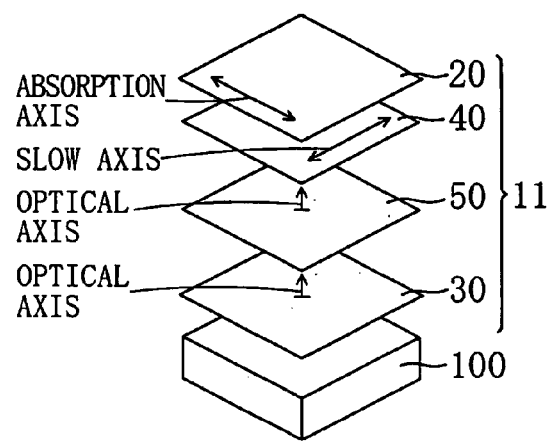
Figure 2C:
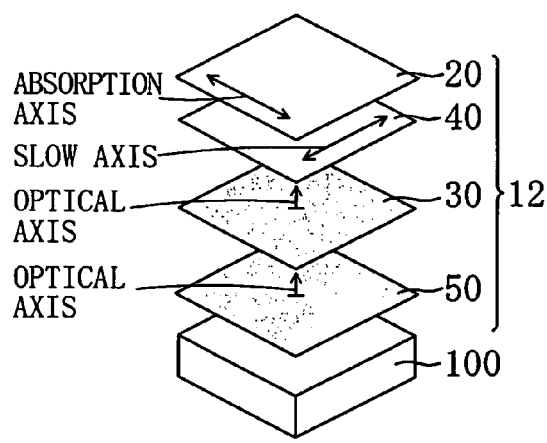

FIGS. 1(a) to 1(c) are schematic sectional views of polarizing elements according to preferred embodiments of the present invention. FIGS. 2(a) to 2(c) are schematic perspective views of the polarizing elements of FIGS. 1(a) to 1(c), respectively. Note that ratios among length, width, and thickness of each structural member in FIGS. 1(a) to 1(c) and 2(a) to 2(c) are different from those of an actual member for clarity. Polarizing elements (10, 11, and 12) are each provided with: a polarizer 20; and a negative C plate 30, a positive A plate 40 and a positive C plate 50 each arranged on one side of the polarizer 20. The positive A plate 40 is arranged between the polarizer 20 and the positive C plate 50 such that a slow axis of the positive A plate 40 is substantially perpendicular to an absorption axis of the polarizer 20. The positive C plate 50 has $Rth_{PC}[590]$ of −60 nm or less, where Rth[590] refers to a thickness direction retardation value measured by using light of a wavelength of 590 nm at 23° C. Note that for practical use, any appropriate protective layer (not shown) may be arranged on an outer side (side having no negative C plate 30 or the like arranged) of the polarizer 20.

The polarizing element 10 shown in FIG. 1(a) is provided with the polarizer 20, the negative C plate 30, the positive A plate 40, and the positive C plate 50 in the order given. The polarizing element 11 shown in FIG. 1(b) is provided with the polarizer 20, the positive A plate 40, the positive C plate 50, and the negative C plate 30 in the order given. The polarizing element 12 shown in FIG. 1(c) is provided with the polarizer 20, the positive A plate 40, the negative C plate 30, and the positive C plate 50 in the order given. In each of the cases shown in FIGS. 1(a) to 1(c), the positive A plate 40 is arranged between the polarizer 20 and the positive C plate 50 such that the slow axis of the positive A plate 40 is substantially perpendicular to the absorption axis of the polarizer 20. In this way, specific optical elements are used in specific positional relationships, to thereby exhibit functions of respective optical elements as a synergetic effect. The polarizing element of the present invention may be arranged on one side of the liquid crystal cell, for example, to thereby increase a contrast ratio in an oblique direction and reduce a color shift in an oblique direction of a liquid crystal display apparatus. Note that, the polarizing element of the present invention is not limited to examples shown in the figures as long as the object of the present invention can be satisfied. For example, an adhesive layer (typically, a glue line or an anchor coat layer), another optical member (preferably, an isotropic film), or the like may be arranged between the respective optical members shown. Hereinafter, members used for constituting the polarizing element of the present invention are described in more detail.

B. Polarizer

In the specification of the present invention, the term "polarizer" refers to a film capable of converting natural light or polarized light into appropriate polarized light. Any appropriate polarizer may be employed as a polarizer used in the present invention. For example, a polarizer capable of converting natural light or polarized light into linearly polarized light is preferably used.

The polarizer may have any appropriate thickness. The thickness of the polarizer is typically 5 to 80 μm, preferably 10 to 50 μm, and more preferably 20 to 40 μm. A thickness of the polarizer within the above ranges can provide excellent optical properties and mechanical strength.

<B-1. Optical Properties of Polarizer>

A light transmittance (also referred to as single axis transmittance) of the polarizer is preferably 41% or more, and more preferably 43% or more measured by using light of a wavelength of 440 nm at 23° C. A theoretical upper limit of the single axis transmittance is 50%. A degree of polarization is preferably 99.8% or more, and more preferably 99.9% or more. A theoretical upper limit of the degree of polarization is 100%. A single axis transmittance and a degree of polarization within the above ranges can further increase a contrast ratio in a normal line direction of a liquid crystal display apparatus employing the polarizer.

The single axis transmittance and the degree of polarization can be determined by using a spectrophotometer "DOT-3" (trade name, manufactured by Murakami Color Research Laboratory). The degree of polarization can be determined by: measuring a parallel light transmittance ($H_0$) and a perpendicular light transmittance ($H_{90}$) of the polarizer; and using the following equation. Degree of polarization (%)={$(H_0-H_{90})/(H_0+H_{90})$}$^{1/2}$×100. The parallel light transmittance ($H_0$) refers to a transmittance of a parallel laminate polarizer produced by piling two identical polarizers such that respective absorption axes are parallel to each other. The perpendicular light transmittance ($H_{90}$) refers to a transmittance of a perpendicular laminate polarizer produced by piling two identical polarizers such that respective absorption axes are perpendicular to each other. The light transmittance refers to a Y value obtained through color correction by a two-degree field of view (C source) in accordance with JIS Z8701-1982.

<B-2. Means for Arranging Polarizers>

Referring to FIGS. 2(a) to 2(c), any appropriate method may be employed as a method of arranging the polarizer 20 in accordance with the purpose. Preferably, the polarizer 20 is provided with an adhesive layer (not shown) on a surface facing the liquid crystal cell and is attached to a surface of the negative C plate 30 or the positive A plate 40. In this way, a liquid crystal display apparatus may have a high contrast. In the specification of the present invention, the term "adhesive layer" is not particularly limited as long as it is capable of bonding surfaces of adjacent optical elements or polarizers and integrating the adjacent optical elements or polarizers with adhesive strength and adhesive time causing no adverse effects in practical use. Specific examples of the adhesive layer include a glue layer and an anchor coat layer. The adhesive layer may have a multilayer structure in which an anchor coat layer is formed on a surface of an adherend and an adhesive layer is formed thereon.

A thickness of the adhesive layer may be appropriately determined in accordance with intended use, adhesive strength, and the like. The adhesive layer has a thickness of preferably 0.1 to 50 μm, more preferably 0.5 to 40 μm, and most preferably 1 to 30 μm. The thickness within the above range does not cause floating or peeling of the adhered optical element or polarizer, and can provide adhesive strength and adhesive time causing no adverse effects in practical use.

As a material forming the adhesive layer, any appropriate adhesive or anchor coat agent may be employed in accordance with the type of the adherent or the purpose. Specific examples of the adhesive, classified in accordance with form, include a solvent adhesive, an emulsion adhesive, a pressure sensitive adhesive, a resoluble adhesive, a condensation polymerization adhesive, a solventless adhesive, a film adhesive and a hot-melt adhesive. Specific examples of the adhesive, classified in accordance with chemical structure, include a synthetic resin adhesive, a rubber-based adhesive and natural adhesive. In the present specification, the term "adhesive" also includes a viscoelastic substance exhibiting detective adhesive strength at ordinary temperature by applying pressure.

When a polymer film containing as a main component a polyvinyl alcohol-based resin is used as a polarizer, a material for forming the adhesive layer is preferably a water-soluble adhesive. More preferably, the water-soluble adhesive contains a polyvinyl alcohol-based resin as a main component. A specific example of the water-soluble adhesive includes "GOHSEFIMER Z 200" (trade name, available from Nippon Synthetic Chemical Industry Co., Ltd.) which is an adhesive containing as a main component modified polyvinyl alcohol having an acetoacetyl group. The water-soluble adhesive may further contain a crosslinking agent. Examples of the crosslinking agent include an amine compound (for example, trade name "Methaxylenediamine" available from Mitsubishi Gas Chemical Company, Inc.), an aldehyde compound (for example, trade name "Glyoxal" available from Nippon Synthetic Chemical Industry Co., Ltd.), a methylol compound (for example, trade name "Watersol" available from Dainippon Ink and Chemicals, Incorporated), an epoxy compound, an isocyanate compound and polyvalent metal salt.

<B-3. Optical Film Used for Polarizer>

An optical film used for the polarize is not specifically limited. Examples of the optical film include: a stretched film of a polymer film containing as a main component a polyvinyl alcohol-based resin, which contains a dichromatic substance; an O-type polarizer prepared by aligning in a specific direction a liquid crystal composition containing a dichromatic substance and a liquid crystal compound (as disclosed in U.S. Pat. No. 5,523,863); and an E-type polarizer prepared by aligning lyotropic liquid crystals in a specific direction (as disclosed in U.S. Pat. No. 6,049,428).

The polarizer is preferably formed of a stretched film of a polymer film containing as a main component a polyvinyl alcohol-based resin, which contains a dichromatic substance. Such film exhibits a high degree of polarization and therefore provides a liquid crystal display apparatus having a high contrast ratio in a normal line direction. The polymer film containing as a main component a polyvinyl alcohol-based resin is produced for example through a method described in [Example 1] of JP 2000-315144 A.

The polyvinyl alcohol-based resin may be prepared by: polymerizing a vinyl ester-based monomer to obtain a vinyl ester-based polymer; and saponifying the vinyl ester-based polymer to convert vinyl ester units into vinyl alcohol units. Examples of the vinyl ester-based monomer include vinyl formate, vinyl acetate, vinyl propionate, vinyl valerate, vinyl laurate, vinyl stearate, vinyl benzoate, vinyl pivalate, and vinyl versatate. Of those, vinyl acetate is preferred.

The polyvinyl alcohol-based resin may have any appropriate average degree of polymerization. The average degree of polymerization is preferably 1,200 to 3,600, more preferably 1,600 to 3,200, and most preferably 1,800 to 3,000. The average degree of polymerization of the polyvinyl alcohol-based resin can be determined through a method in accordance with JIS K6726-1994.

A degree of saponification of the polyvinyl alcohol-based resin is preferably 90.0 mol % to 99.9 mol %, more preferably 95.0 mol % to 99.9 mol %, and most preferably 98.0 mol % to 99.9 mol % from the viewpoint of durability of the polarizer.

The degree of saponification refers to a ratio of units actually saponified into vinyl ester units to units which may be converted into vinyl ester units through saponification. The degree of saponification of the polyvinyl alcohol-based resin may be determined in accordance with JIS K6726-1994.

The polymer film containing as a main component a polyvinyl alcohol-based resin to be used in the present invention may preferably contain polyvalent alcohol as a plasticizer. Examples of the polyvalent alcohol include ethylene glycol, glycerin, propylene glycol, diethylene glycol, triethylene glycol, tetraethylene glycol, and trimethylolpropane. The polyvalent alcohol may be used independently or in combination. In the present invention, ethylene glycol or glycerin is preferably used from the viewpoints of stretchability, transparency, thermal stability, and the like.

A use amount of the polyvalent alcohol in the present invention is preferably 1 to 30 parts by weight, more preferably 3 to 25 parts by weight, and most preferably 5 to 20 parts by weight with respect to 100 parts by weight of a total solid content in the polyvinyl alcohol-based resin. A use amount of the polyvalent alcohol within the above ranges can further enhance coloring property or stretchability.

The polymer film containing as a main component a polyvinyl alcohol-based resin may further contain surfactant. The use of surfactant can further enhance coloring property, stretchability or the like.

Any appropriate type of surfactant may be employed as the surfactant. Specific examples of the surfactant include anionic surfactant, cationic surfactant and nonionic surfactant. Nonionic surfactant is preferably used in the present invention. Specific examples of the nonionic surfactant include lauric diethanolamide, coconut oil fatty acid diethanolamide, coconut oil fatty acid monoethanolamide, lauric monoisopropanolamide, and oleic monoisopropanolamide. However, the surfactant is not limited thereto. In the present invention, lauric diethanolamide is preferably used.

A use amount of the surfactant is preferably more than 0 and 1 parts by weight or less, more preferably 0.01 to 0.5 parts by weight, and most preferably 0.05 to 0.3 parts by weight with respect to 100 parts by weight of the polyvinyl alcohol-based resin. A use amount of the surfactant within the above ranges can further enhance coloring property or stretchability.

Any appropriate dichromatic substance may be employed as the dichromatic substance. Specific examples thereof include iodine and a dichromatic dye. In the specification of the present invention, the term "dichromatic" refers to optical anisotropy in which light absorption differs in two directions of an optical axis direction and a direction perpendicular thereto.

Examples of the dichromatic dye include Red BR, Red LR, Red R, Pink LB, Rubin BL, Bordeaux GS, Sky Blue LG, Lemon Yellow, Blue BR, Blue 2R, Navy RY, Green LG, Violet LB, Violet B, Black H, Black B, Black GSP, Yellow 3G, Yellow R, Orange LR, Orange 3R, Scarlet GL, Scarlet KGL, Congo Red, Brilliant Violet BK, Supra Blue G, Supra Blue GL, Supra Orange GL, Direct Sky Blue, Direct Fast Orange S, and Fast Black.

Figure 3:
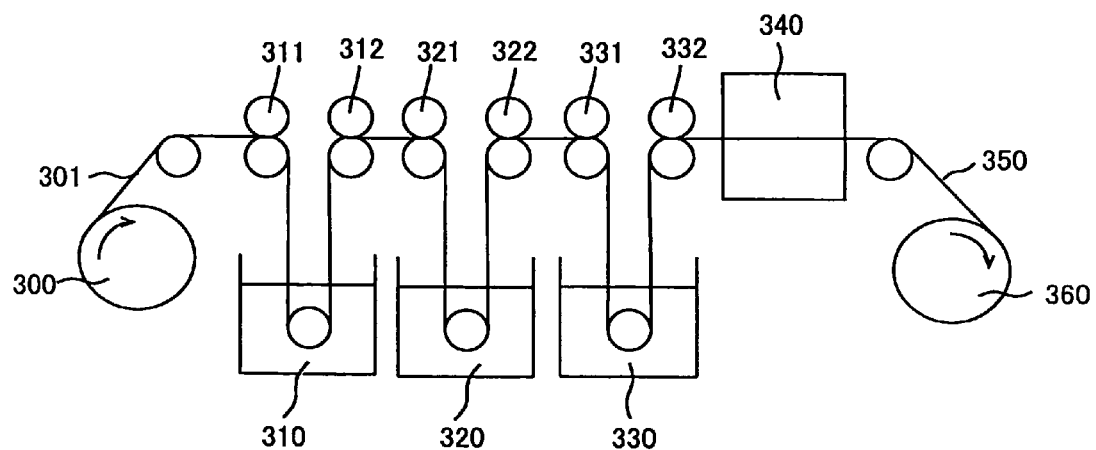
[FIG. 3] A schematic diagram showing a concept of a typical production process for a polarizer to be used in the present invention.

An example of a method of producing a polarizer will be described by referring to FIG. 3. FIG. 3 is a schematic diagram showing a concept of a typical production process of a polarizer used in the present invention. For example, a polymer film 301 containing as a main component a polyvinyl alcohol-based resin is fed from a feed roller 300, immersed in an aqueous iodine solution bath 310, and subjected to swelling and coloring treatment under tension in a longitudinal direction of the film by rollers 311 and 312 at different speed ratios. Next, the film is immersed in a bath 320 of an aqueous solution containing boric acid and potassium iodide, and subjected to crosslinking treatment under tension in a longitudinal direction of the film by rollers 321 and 322 at different speed ratios. The film subjected to crosslinking treatment is immersed in a bath 330 of an aqueous solution containing potassium iodide by rollers 331 and 332, and subjected to water washing treatment. The film subjected to water washing treatment is dried by drying means 340 to adjust its moisture content, and taken up in a take-up part 360. The polymer film containing as a main component a polyvinyl alcohol-based resin may be stretched to a 5 to 7 times length of the original length through the above process, to thereby provide a polarizer 350.

The polarizer may have any appropriate moisture content. More specifically, the moisture content is preferably 5% to 40%, more preferably 10% to 30%, and most preferably 20% to 30%.

C. Negative C Plate

In the specification of the present invention, the term "negative C plate" refers to a negative uniaxial optical element satisfying a refractive index profile of $nx=ny>nz$. Ideally, the negative uniaxial optical element satisfying a refractive index profile of $nx=ny>nz$ has an optical axis in a normal line direction. In the specification of the present invention, $nx=ny$ not only refers to a case where nx and ny are completely equal but also includes a case where nx and ny are substantially equal. The phrase "case where nx and ny are substantially equal" includes a case where an in-plane retardation value (Re[590]) determined by using light of a wavelength of 590 nm at 23° C. is 10 nm or less, for example. Note that Re[590] of an optical element is described below. Here, nx represents a refractive index in a slow axis direction, and ny represents a refractive index in a fast axis direction. Further, nz represents a refractive index in a thickness direction. The slow axis direction refers to a direction providing a maximum in-plane refractive index, and the fast axis direction refers to a direction perpendicular to the slow axis direction in the same plane.

Referring to FIGS. 1(a) to 1(c) and 2(a) to 2(c), the negative C plate 30 may be arranged in any appropriate position as long as being arranged between the polarizer 20 and the liquid crystal cell 100. As shown in FIG. 2(a), the negative C plate 30 is preferably arranged between the polarizer 20 and the positive A plate 40. According to such embodiment, the negative C plate 30 also serves as a protective layer of a liquid crystal side of the polarizer 20 such that a display screen may maintain uniformity for a long period of time even in the case where a polarizing element of the present invention is used in a liquid crystal display apparatus in a high temperature and high humidity environment.

<C-1. Optical Properties of Negative C Plate>

In the specification of the present invention, Re[590] refers to an in-plane retardation value determined by using light of a wavelength of 590 nm at 23° C. Re[590] can be determined from an equation Re[590]=(nx−ny)×d.

The negative C plate to be used in the present invention has $Re_{NC}[590]$ of 10 nm or less, preferably 5 nm or less, and more preferably 3 nm or less. Note that a theoretical lower limit of $Re_{NC}[590]$ of the negative C plate is 0 nm.

In the specification of the present invention, Rth[590] refers to a thickness direction retardation value determined by using light of a wavelength of 590 nm at 23° C. Rth[590] can be determined from an equation Rth[590]=(nx−nz)×d.

$Rth_{NC}[590]$ of the negative C plate to be used in the present invention is 20 nm or more, preferably 30 nm to 200 nm, and more preferably 30 nm to 160 nm. Specifically, $Rth_{NC}[590]$ of the negative C plate in the polarizing element of the present invention according to an embodiment shown in FIG. 2(a) is preferably 30 nm to 160 nm, more preferably 30 nm to 140 nm, and particularly preferably 30 nm to 120 nm. $Rth_{NC}[590]$ of the negative C plate in the polarizing element of the present invention according to an embodiment shown in FIG. 2(b) or 2(c) is preferably 50 nm to 200 nm, more preferably 50 nm to 160 nm, and most preferably 50 nm to 120 nm. $Rth_{NC}[590]$ within the above ranges provides a synergetic effect of exhibiting the functions of the respective optical elements, and allows increase in a contrast ratio in an oblique direction and reduction in a color shift in an oblique direction of a liquid crystal display apparatus.

In addition, $Rth_{NC}[590]$ of the negative C plate is preferably adjusted such that a sum ($Rth_{add}$) of $Rth_{NC}[590]$ of the negative C plate and $Rth_{PC}[590]$ of the positive C plate falls within a range of −150 nm to 10 nm, more preferably −150 nm to −30 nm, and particularly preferably −130 nm to −40 nm. Specifically, $Rth_{add}$ of the polarizing element of the present invention according to an embodiment shown in FIG. 2(a) is preferably −90 nm to −30 nm, and particularly preferably −80 nm to −40 nm. $Rth_{add}$ of the polarizing element of the present invention according to an embodiment shown in FIG. 2(b) or 2(c) is preferably −150 nm to −50 nm, and more preferably −130 nm to −70 nm. Note that $Rth_{PC}[590]$ of the positive C plate is described below in the section E-1.

Re[590] and Rth[590] may be determined by using "KOBRA-21ADH" (trade name, manufactured by Oji Scientific Instruments). Refractive indices nx, ny, and nz can be determined by: using an in-plane retardation value (Re) determined at a wavelength of 590 nm at 23° C., a retardation value (R40) determined by inclining a slow axis by 40° as a tilt angle, a thickness (d) of a retardation film, and an average refractive index (n0) of the retardation film; and using the following equations (i) to (iii) for computational numerical calculation. Then, Rth can be calculated from the following equation (iv). Here, Φ and ny' are represented by the following respective equations (v) and (vi).

$$Re=(nx-ny)\times d \quad (i)$$

$$R40=(nx-ny')\times d/\cos(\Phi) \quad (ii)$$

$$(nx+ny+nz)/3=n0 \quad (iii)$$

$$Rth=(nx-nz)\times d \quad (iv)$$

$$\Phi=\sin^{-1}[\sin(40°)/n0] \quad (v)$$

$$ny'=ny\times nz/[ny^2\times\sin^2(\Phi)+nz^2\times\cos^2(\Phi)]^{1/2} \quad (vi)$$

<C-2. Means for Arranging Negative C Plate>

Referring to FIGS. 2(a) to 2(c), any appropriate method may be employed as a method of arranging the negative C plate 30 in accordance with the purpose. Preferably, the negative C plate 30 is provided with an adhesive layer (not shown) on each side, to be attached to the polarizer 20 and the negative A plate 40 according to an embodiment shown in FIG. 2(a), for example. In this way, gaps among the optical elements are filled with the adhesive layers, thereby being capable of preventing shift in relationships among optical axes of the respective optical elements, and of preventing damages on the optical elements due to abrasion of the respective optical elements upon incorporating into the liquid crystal display apparatus. Further, adverse effects of reflection or refraction that generates on the interface among the layers of the optical element can be reduced, to thereby allow increase in contrast ratios in frontal or oblique directions of a liquid crystal display apparatus.

A thickness of the adhesive layer may appropriately be determined in accordance with the intended use, adhesive strength, and the like. The thickness of the adhesive layer is preferably 0.1 µm to 50 µm, more preferably 0.5 µm to 40 µm, and most preferably 1 µm to 30 µm. A thickness of the adhesive layer within the above ranges prevents floating or peeling of optical elements or polarizers to be bonded and may provide adhesive strength and adhesive time causing no adverse effects in practical use.

Any appropriate material may be selected as a material used for forming the adhesive layer from the materials described in the above section B-2, for example. Preferred materials each used for forming an appropriate adhesive layer for laminating optical elements are a pressure-sensitive adhesive (also referred to as an acrylic pressure-sensitive adhesive) containing an acrylic polymer as a base polymer and an isocyanate-based adhesive from viewpoints of excellent optical transparency, appropriate wetness and adhesiveness, and excellent weatherability and heat resistance. A specific example of the acrylic pressure-sensitive adhesive is Non Support Double-faced Tape (trade name, "SK-2057", available from Soken Chemical & Engineering Co., Ltd.). A specific example of the isocyanate-based adhesive is "Takenate 631" (trade name, available from Mitsui Takeda Chemicals, Inc.).

In the case where nx and ny are completely equal, the negative C plate 30 has no in-plane retardation value and a slow axis is not detected. Thus, the negative C plate may be arranged independently of an absorption axis of the polarizer 20 and a slow axis of the positive A plate 40. In the case where nx and ny are substantially equal but slightly different, the slow axis may be detected. In this case, the negative C plate 30 is preferably arranged such that its slow axis is substantially parallel or substantially perpendicular to the absorption axis of the polarizer 20. In the specification of the present invention, the phrase "substantially parallel" includes a case where an angle formed between two directions (in this case, an angle formed between the slow axis of the negative C plate 30 and the absorption axis of the polarizer 20) is 0°±2.0°, preferably 0°±1.0°, and more preferably 0±0.5°. The phrase "substantially perpendicular" includes a case where an angle formed between two directions (in this case, an angle formed between the slow axis of the negative C plate 30 and the absorption axis of the first polarizer 20) is 90°±2.0°, preferably 90°±1.0°, and more preferably 90°±0.5°. An angle greatly departing from the above ranges tends to provide a liquid crystal display apparatus having reduced contrast ratios in frontal and oblique directions.

<C-3. Structure of Negative C Plate>

A structure (laminate structure) of the negative C plate is not particularly limited as long as the optical properties as described in the above section C-1 are satisfied. To be specific, the negative C plate may be a single retardation film, or a laminate of two or more retardation films. The negative C plate is preferably a single retardation film for reducing shift or unevenness in retardation values due to shrinkage stress of the polarizer or heat of backlight and which may reduce the thickness of a liquid crystal panel. The negative C plate as a laminate may include an adhesive layer (such as a glue layer or an anchor coat layer). In a case where the negative C plate as a laminate includes two or more retardation films, the retardation films may be identical to or different from each other. Details of the retardation film will be described below in C-4.

Rth[590] of the retardation film to be used for the negative C plate may appropriately be selected in accordance with the number of the retardation films to be used. In the case where the negative C plate is formed of a single retardation film, for example, Rth[590] of the retardation film is preferably equal to Rth[590] of the negative C plate. Thus, a retardation value of an adhesive layer to be used for laminating the negative C plate to the polarizer, the positive A plate or the positive C plate is preferably as small as possible. Further, in the case where the negative C plate is a laminate including two or more retardation films, for example, the laminate is preferably designed such that total Rth[590] of the retardation films is equal to $Rth_{NC_T}[590]$ of the negative C plate. To be specific, for production of a negative C plate having $Rth_{NC_T}[590]$ of 60 nm by laminating two retardation films, the retardation films may each have Rth[590] of 30 nm. Alternatively, one retardation film may have Rth[590] of 10 nm, and the other retardation film may have Rth[590] of 50 nm. In lamination of two retardation films, the retardation films are preferably arranged such that the respective slow axes are perpendicular to each other, to thereby reduce Re[590]. Note that the negative C plate formed of two or less retardation films was described for clarification, but the present invention may obviously be applied to a laminate including three or more retardation films.

A total thickness of the negative C plate is preferably 1 μm to 200 μm, more preferably 2 μm to 150 μm, and most preferably 3 μm to 100 μm. A thickness within the above ranges can provide an optical element with excellent optical uniformity.

<C-4. Retardation Film to be Used for Negative C Plate>

A retardation film to be used for the negative C plate is not particularly limited. However, the retardation film to be preferably used has excellent transparency, mechanical strength, heat stability, water barrier property, and the like, and causes no optical unevenness due to distortion.

An absolute value of photoelastic coefficient (C[590] ($m^2$/N)) of the retardation film is preferably $1\times10^{-12}$ to $200\times10^{-12}$, more preferably $1\times10^{-12}$ to $50\times10^{-12}$, and most preferably $1\times10^{-12}$ to $30\times10^{-12}$. A smaller absolute value of photoelastic coefficient reduces shift or unevenness in retardation values due to shrinkage stress of the polarizers or heat of backlight of a liquid crystal display apparatus incorporating the retardation film, to thereby provide a liquid crystal display apparatus having excellent display uniformity.

The retardation film has a light transmittance of preferably 80% or more, more preferably 85% or more, and particularly preferably 90% or more measured by using light of a wavelength of 590 nm at 23° C. The negative C plate preferably has a similar light transmittance. Note that a theoretical upper limit of the light transmittance is 100%.

The negative C plate to be used in the present invention preferably includes a polymer film containing as a main component a thermoplastic resin. The thermoplastic resin is more preferably a non-crystalline polymer. The non-crystalline polymer has an advantage of excellent transparency. The polymer film containing as a main component a thermoplastic resin may or may not be stretched.

A thickness of the polymer film containing as a main component a thermoplastic resin may appropriately be selected in accordance with the retardation values to be designed, the type of thermoplastic resin to be used, and the like. The thickness thereof is preferably 20 μm to 120 μm, and more preferably 30 μm to 100 μm. A thickness within the above ranges may provide a retardation film having excellent mechanical strength and optical uniformity and satisfying the optical properties described in the above section C-1.

Examples of the thermoplastic resin include: general purpose plastics such as a polyolefin resin, a cycloolefin-based resin, a polyvinyl chloride-based rein, a cellulose-based resin, a styrene-based resin, an acrylonitrile/butadiene/styrene-based resin, an acrylonitrile/styrene-based resin, polymethyl methacrylate, polyvinyl acetate, and a polyvinylidene chloride-based resin; general purpose engineering plastics such as a polyamide-based resin, a polyacetal-based resin, a polycarbonate-based resin, a modified polyphenylene ether-based resin, a polybutylene terephthalate-based resin, and a polyethylene terephthalate-based resin; and super engineering plastics such as a polyphenylene sulfide-based resin, a polysulfone-based resin, a polyether sulfone-based resin, a polyether ether ketone-based resin, a polyallylate-based resin, a liquid crystalline resin, a polyamideimide-based resin, a polyimide-based resin, and a polytetrafluoroethylene-based resin. The thermoplastic resin may be used alone or in combination. Further, the thermoplastic resin may be used after optionally undertaking appropriate polymer modification. Examples of the polymer modification include copolymerization, crosslinking, molecular-terminal modification, and stereoregularity modification.

The negative C plate preferably includes a polymer film containing as a main component at least one thermoplastic resin selected from a cellulose-based resin, a polyamideimide-based resin, a polyether ether ketone-based resin, and a polyimide-based resin. In the case where such thermoplastic resin is formed into a sheet through a solvent casting method, for example, molecules align spontaneously during evaporation of a solvent. Thus, a retardation film satisfying a refractive index profile of nx=ny>nz can be obtained without requiring special fabrication such as stretching treatment. The polymer film containing as a main component a cellulose-based resin may be obtained through a method described in JP-A-2001-188128, for example. The polymer film containing as a main component a polyamideimide-based resin, a polyether ether ketone-based resin, or a polyimide-based resin may be obtained through a method described in JP-A-2003-287750.

The thermoplastic resin has a weight average molecular weight (Mw) of preferably 25,000 to 200,000, more preferably 30,000 to 100,000, and particularly preferably 40,000 to 80,000 determined through gel permeation chromatography (GPC) by using a tetrahydrofuran solvent. A weight average molecular weight of a thermoplastic resin within the above ranges can provide a polymer film having excellent mechanical strength, solubility, forming property, and casting workability.

Any appropriate forming method may be employed as a method of obtaining the polymer film containing as a main component a thermoplastic resin. Specific examples of the forming method include compression molding, transfer molding, injection molding, extrusion, blow molding, powder molding, FRP molding, solvent casting, and the like. Of those, solvent casting is preferred because a highly smooth retardation film having favorable optical uniformity can be obtained. To be specific, the solvent casting involves: defoaming a rich solution (dope) prepared by dissolving in a solvent a resin composition containing a thermoplastic resin as a main component, a plasticizer, an additive, and the like; uniformly casting the defoamed solution into a sheet on a surface of an endless stainless steel belt or rotating drum; and evaporating the solvent to produce a film.

The conditions to be employed in formation of the polymer film containing as a main component a thermoplastic resin may appropriately be selected in accordance with the composition or type of the resin, a forming method, and the like. In a solvent casting method, examples of a solvent to be used include cyclopentanone, cyclohexanone, methyl isobutyl ketone, toluene, ethyl acetate, dichloromethane, and tetrahydrofuran. A method of drying the solvent preferably involves: using an air-circulating drying oven or the like; and drying while gradually increasing a temperature from a low temperature to a high temperature. A temperature range for drying of the solvent is preferably 50° C. to 250° C., and more preferably 80° C. to 150° C. The above-mentioned conditions are selected, to thereby provide a retardation film having small Re[590] and excellent smoothness and optical uniformity. Note that Rth[590] may appropriately be adjusted by selecting the composition or type of the resin, drying conditions, a thickness of the film after formation, and the like.

The polymer film containing as a main component a thermoplastic resin may further contain any appropriate additive. Specific examples of the additive include a plasticizer, a thermal stabilizer, a light stabilizer, a lubricant, an antioxidant, a UV absorber, a flame retardant, a colorant, an antistatic agent, a compatibilizing agent, a crosslinking agent, and a thickener. The type and amount of the additive to be used may be appropriately set depending on the purpose. For example, a use amount of the additive is preferably more than 0 and 10 parts by weight or less, more preferably more than 0 and 5 parts by weight or less, and most preferably more than and 3 parts by weight or less with respect to 100 parts by weight of the thermoplastic resin.

In addition to the retardation films described above, a commercially available polymer film as it is may be used as the retardation film to be used for the negative C plate. Further, a commercially available optical film may be subjected to fabrication such as stretching treatment and/or relaxation treatment before use. Specific examples of a commercially available polymer film include: "Fujitac series" (UZ, TD, etc., trade name, available from Fuji Photo Film Co., Ltd.); "Arton series" (G, F, etc., trade name, available from JSR Corporation); "Zeonex 480" (tradename, available from Zeon Corporation); and "Zeonor" (trade name, available from Zeon Corporation).

Figure 4A:
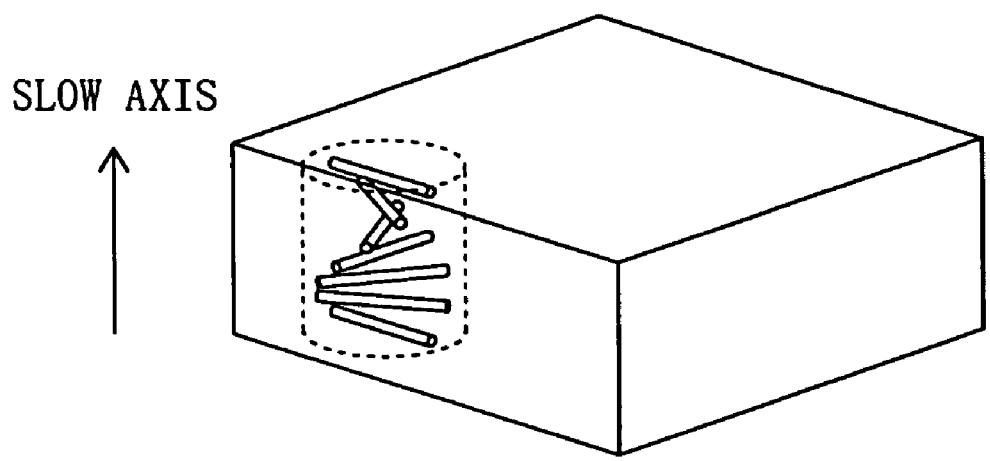
[FIG. 4] (a) is a schematic diagram explaining a calamitic liquid crystal compound in planar alignment, and (b) is a schematic diagram explaining a discotic liquid crystal compound in columnar alignment.
Figure 4B:
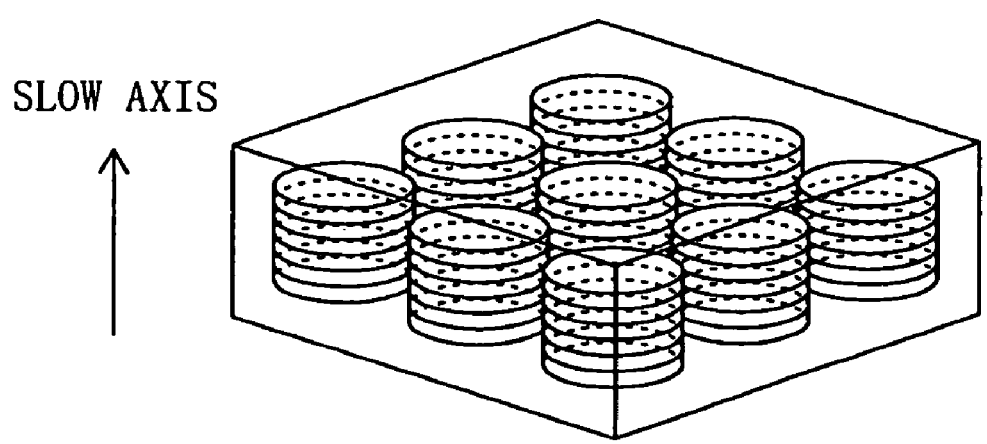

The retardation film to be used for the negative C plate may contain a liquid crystal composition. In the case where the liquid crystal composition is used, the retardation film to be used for the negative C plate is preferably a solidified layer or cured layer of a liquid crystal composition containing a liquid crystal compound in planar alignment, or a solidified layer or cured layer of a liquid crystal composition containing a discotic liquid crystal compound in columnar alignment. In the specification of the present invention, the term "planar alignment" refers to a state where a liquid crystal compound (liquid crystal molecules) is aligned such that a helical axis of liquid crystals is vertical to both substrate surfaces (see FIG. 4(a), for example). The term "columnar alignment" refers to a state where a discotic liquid crystal compound is aligned so as to stack as a column (see FIG. 4(b), for example). Further, the term "solidified layer" refers to a layer which is prepared by cooling a softened or molten liquid crystal composition or a liquid crystal composition in a solution state into a solidified state. The term "cured layer" refers to a layer which is prepared by partly or entirely crosslinking the liquid crystal composition by heat, a catalyst, light, and/or radiation into a stable insoluble and non-melted state or a stable hardly soluble and hardly melted state. Note that the cured layer includes a cured layer prepared from a solidified layer of a liquid crystal composition.

In the specification of the present invention, the term "liquid crystal composition" refers to a composition having a liquid crystal phase and exhibiting liquid crystallinity. Examples of the liquid crystal phase include a nematic liquid crystal phase, a smectic liquid crystal phase, a cholesteric liquid crystal phase, and a columnar liquid crystal phase. The liquid crystal composition to be used in the present invention is preferably a liquid crystal composition exhibiting a nematic liquid crystal phase for attaining a retardation film having high transparency.

The liquid crystal composition is not particularly limited as long as the composition contains a liquid crystal compound and exhibits liquid crystallinity. A content of the liquid crystal compound in the liquid crystal composition is preferably 40 parts by weight to 100 parts by weight, more preferably 50 parts by weight to 99.8 parts by weight, and most preferably 70 parts by weight to 99.5 parts by weight with respect to 100 parts by weight of a total solid content in the liquid crystal composition. The liquid crystal composition preferably further contains a chiral agent. The chiral agent is introduced in an appropriate amount in accordance with the purposes, to thereby provide a film having a desired refractive index profile. The liquid crystal composition may contain various additives such as a leveling agent, a polymerization initiator, an alignment assistant, a heat stabilizer, a lubricant, a plasticizer, and an antistatic agent within a range not compromising the object of the present invention. Further, the liquid crystal composition may contain any appropriate thermoplastic resins within a range not compromising the object of the present invention.

In the specification of the present invention, the term "liquid crystal compound" refers to a compound having a mesogen group in a molecular structure and forming a liquid crystal phase through temperature change such as heating or cooling or through an action of a solvent in a certain amount. The term "mesogen group" refers to a structural part required for forming a liquid crystal phase and generally includes a ring unit. Examples of the mesogen group include a biphenyl group, a phenylbenzoate group, a phenylcyclohexane group, an azoxybenzene group, an azomethine group, an azobenzene group, a phenylpyrimidine group, a diphenylacetylene group, a diphenylbenzoate group, a bicyclohexane group, a cyclohexylbenzene group, and a terphenyl group. Note that the terminals of each of those ring units may have a substituent such as a cyano group, an alkyl group, an alkoxy group, or a halogen group, for example. Of those, for a mesogen group composed of a ring unit or the like, a mesogen group having a biphenyl group or a phenylbenzoate group is preferably used.

The liquid crystal compound may include thermotropic liquid crystals exhibiting a liquid crystal phase in accordance with temperature change or lyotropic liquid crystals exhibiting a liquid crystal phase in accordance with a concentration of a solute (a liquid crystal compound) in a solution. The thermotropic liquid crystals include enantropic liquid crystals in which a phase transition from a crystal phase (or glass state) to a liquid crystal phase is reversible, and monotropic liquid crystals in which a liquid crystal phase develops only during temperature decrease. The thermotropic liquid crystals are preferably used for the retardation film to be used for the negative C plate because of excellent productivity, operability, quality, and the like in film formation.

The liquid crystal compound may be a polymer substance (also referred to as polymer liquid crystals) having a mesogen group on a main chain and/or a side chain, or a low molecular weight substance (also referred to as low molecular weight liquid crystals) having a mesogen group in a part of a molecular structure. The polymer liquid crystals in a liquid crystal state may be cooled to fix an alignment state of molecules, and thus have such a feature in that productivity in film formation is high and a formed film has excellent heat resistance, mechanical strength, and chemical resistance. The low molecular weight liquid crystals have excellent alignment property, and thus have such a feature in that a highly transparent film is easily obtained.

A retardation film formed of the solidified layer or cured layer of the liquid crystal composition containing a liquid crystal compound in planar alignment may be obtained through a method described in JP-A-2003-287623. A retardation film formed of the solidified layer or cured layer of the liquid crystal composition containing a discotic liquid crystal compound in columnar alignment may be obtained through a method described in JP-A-09-117983.

A thickness of the retardation film formed of the solidified layer or cured layer of the liquid crystal composition containing a liquid crystal compound in planar alignment or retardation film formed of the solidified layer or cured layer of the liquid crystal composition containing a discotic liquid crystal compound in columnar alignment to be used for the negative C plate is preferably 1 µm to 20 µm, and more preferably 1 µm to 10 µm. A thickness of the retardation film within the above ranges may provide a thin retardation film having excellent optical uniformity and satisfying the optical properties described in the above section C-1.

D. Positive A Plate

In the specification of the present invention, the term "positive A plate" refers to a positive uniaxial optical element satisfying a refractive index profile of nx>ny=nz. Note that in the specification of the present invention, the expression "ny=nz" not only refers to a case where ny and nz are completely equal, but also includes a case where ny and nz are substantially equal. The phrase "case where ny and nz are substantially equal" includes a case where an absolute value of a difference (|Rth[590]−Re[590]|) between an in-plane retardation value (Re[590]) and a thickness direction retardation value (Rth[590]) is 10 nm or less, for example.

Referring to FIGS. 1(a) to 1(c) and 2(a) to 2(c), the positive A plate 40 is arranged between the polarizer 20 and the positive C plate 50 such that a slow axis of the positive A plate 40 is substantially perpendicular to the absorption axis of the polarizer 20. As long as such a relationship is satisfied, the negative C plate 30 may be arranged between the polarizer 20 and the positive C plate 50 as shown in FIGS. 1(a) and 1(c) and FIGS. 2(a) and 2(c). As shown in FIG. 2(a), the positive A plate 40 is preferably arranged between the negative C plate 30 and the positive C plate 50. According to such embodiment, the negative C plate 30 also serves as a protective layer of a liquid crystal side of the polarizer 20 such that a display screen may maintain uniformity for a long period of time even in the case where the polarizing element of the present invention is used for a liquid crystal display apparatus in a high temperature and high humidity environment.

<D-1. Optical Properties of Positive A Plate>

$Re_{PA}[590]$ of the positive A plate to be used in the present invention is preferably 20 nm or more, more preferably 60 nm to 180 nm, furthermore preferably 70 nm to 170 nm, particularly preferably 80 nm to 160 nm, and most preferably 90 nm to 150 nm. To be specific, $Re_{PA}[590]$ of the positive A plate in the polarizing element of the present invention according to an embodiment shown in FIG. 2(a) is preferably 70 nm to 130 nm, particularly preferably 80 nm to 120 nm, and most preferably 80 nm to 110 nm. $Re_{PA}[590]$ of the positive A plate in the polarizing element of the present invention according to an embodiment shown in FIG. 2(b) or 2(c) is preferably 110 nm to 170 nm, more preferably 120 nm to 160 nm, and most preferably 130 nm to 150 nm. $Re_{PA}[590]$ within the above ranges provides a synergetic effect of exhibiting the functions of the respective optical elements, and allows increase in a contrast ratio in an oblique direction and reduction in a color shift in an oblique direction of a liquid crystal display apparatus.

An absolute value ($|Rth_{PA}[590]−Re_{PA}[590]|$) of a difference between $Re_{PA}[590]$ and $Rth_{PA}[590]$ of the positive A plate to be used in the present invention is preferably 10 nm or less, more preferably 5 nm or less, and most preferably 2 nm or less. Note that a theoretical lower limit of $|Rth_{PA}[590]−Re_{PA}[590]|$ is 0 nm.

In general, the retardation values of the retardation film may vary depending on a wavelength. This phenomenon is refereed to as wavelength dispersion property of the retardation film. In the specification of the present invention, the wavelength dispersion property may be determined by a ratio Re[480]/Re[590] of in-plane retardation values measured by using light of wavelengths of 480 nm and 590 nm at 23° C.

$Re_{PA}[480]/Re_{PA}[590]$ of the positive A plate is preferably more than 0.8 and less than 1.2, more preferably more than 0.8 and less than 1.0, and particularly preferably more than 0.8 and less than 0.9. In the case where $Re_{PA}[480]/Re_{PA}[590]$ is less than 1, the positive A plate exhibits a property in which the retardation values are smaller with a shorter wavelength, and this phenomenon is referred to as "reverse wavelength dispersion property". A retardation film exhibiting reverse wavelength dispersion property has uniform retardation values in a wide visible light region. Thus, a liquid crystal display apparatus employing such a retardation film hardly causes light leak of a specific wavelength, and color shift in an oblique direction in black display of the liquid crystal display apparatus may be further improved.

<D-2. Means for Arranging Positive A Plate>

Referring to FIGS. 2(a) to 2(c), any appropriate method may be employed as a method of arranging the positive A plate 40 between the polarizer 20 and the positive C plate 50. Preferably, the positive A plate 40 is provided with an adhesive layer (not shown) on each side and is attached to the polarizer 20 and the positive C plate 50 or the negative C plate 30. In this way, gaps among the optical elements are filled with the adhesive layers, thereby being capable of preventing shift in relationships among optical axes of the respective optical elements, and of preventing damages on the optical elements due to abrasion of the respective optical elements upon incorporating into the liquid crystal display apparatus. In addition, adverse effects of reflection or refraction that generates on the interface among the respective optical elements can be reduced, to thereby allow increase in a contrast ratio in an oblique direction and reduction in a color shift in an oblique direction of a liquid crystal display apparatus.

The thickness of the adhesive layer and the material used for forming the adhesive layer may appropriately be selected from the ranges and materials as those exemplified in the above section B-2 or as those described in the above section C-2.

As described above, the positive A plate 40 is arranged such that its slow axis is substantially perpendicular to the absorption axis of the polarizer 20. A positional relationship greatly departing from the above relationships tends to reduce contrast ratios in frontal and oblique directions in a liquid crystal display apparatus employing the positive A plate 40.

<D-3. Structure of Positive A Plate>

A structure (laminate structure) of the positive A plate is not particularly limited as long as the optical properties as described in the above section D-1 are satisfied. The positive A plate may be a single retardation film, or a laminate of two or more retardation films. The positive A plate is preferably a single retardation film for reducing shift or unevenness in retardation values due to shrinkage stress of the polarizer or heat of backlight and which may reduce the thickness of a liquid crystal panel. The positive A plate as a laminate may include an adhesive layer for attaching two or more retardation films. In a case where the positive A plate as a laminate includes two or more retardation films, the retardation films may be identical to or different from each other. Details of the retardation film will be described below in D-4.

Re[590] of the retardation film to be used for the positive A plate may appropriately be selected in accordance with the number of the retardation films to be used. In the case where the positive A plate is formed of a single retardation film, for example, Re[590] of the retardation film is preferably equal to $Re_{PA}[590]$ of the positive A plate. Thus, retardation values of adhesive layers to be used for laminating the positive A plate to the polarizer and the positive C plate are preferably as small as possible. Further, in the case where the positive A plate is a laminate including two or more retardation films, for example, the laminate is preferably designed such that total Re[590] of the retardation films is equal to $Re_{PA}590$ of the positive A plate. To be specific, a positive A plate having $Re_{PA}[590]$ of 100 nm can be obtained by laminating two retardation films each having Re[590] of 50 nm such that the respective slow axes are parallel to each other. Note that only the positive A plate formed of two or less retardation films was described for clarification, but the present invention may obviously be applied to a laminate including three or more retardation films.

A total thickness of the positive A plate is preferably 1 to 200 μm, more preferably 2 to 150 μm, and most preferably 3 to 100 μm. A thickness within the above ranges can provide an optical element having excellent optical uniformity.

<D-4. Retardation Film to be Used for Positive A Plate>

A retardation film to be used for the positive A plate is not particularly limited. However, the retardation film which has excellent transparency, mechanical strength, heat stability, water barrier property, and the like, and causes no optical unevenness due to distortion is preferably used.

An absolute value of photoelastic coefficient (C[590] (m²/N)) of the retardation film is preferably $1 \times 10^{-12}$ to $200 \times 10^{-12}$, more preferably $1 \times 10^{-12}$ to $50 \times 10^{-12}$, and most preferably $1 \times 10^{-12}$ to $20 \times 10^{-12}$. A smaller absolute value of photoelastic coefficient reduces shift or unevenness in retardation values due to shrinkage stress of the polarizers or heat of backlight when a liquid crystal display apparatus employs the retardation film, to thereby provide a liquid crystal display apparatus having excellent display uniformity.

The retardation film has a transparency of preferably 80% or more, more preferably 85% or more, and most preferably 90% or more measured by using light of a wavelength of 590 nm at 23° C. The positive A plate preferably has a similar transparency. Note that a theoretical upper limit of the transparency is 100%.

The retardation film is preferably a stretched film of a polymer film containing as a main component a thermoplastic resin. The retardation film is more preferably a stretched film of a polymer film containing as a main component a non-crystalline polymer of a thermoplastic resin. The non-crystalline polymer has an advantage of excellent transparency. In the specification of the present invention, the term "stretched film" refers to a plastic film having enhanced alignment of molecules in a specific direction by applying tension to an unstretched film at an appropriate temperature or applying additional tension to a film stretched in advance.

A thickness of the stretched film of a polymer film containing as a main component a thermoplastic resin may appropriately be selected in accordance with the retardation values to be designed, the number of layers in a laminate, and the like. The thickness thereof is preferably 5 μm to 120 μm, and more preferably 10 μm to 100 μm. A thickness thereof within the above ranges may provide a retardation film having excellent mechanical strength and optical uniformity and satisfying the optical properties described in the above section D-1.

The thermoplastic resin may appropriately be selected from the materials described in the above section C-4, for example. The retardation film to be used for the positive A plate is preferably a stretched film of a polymer film containing a styrene-based resin. The styrene-based resin is used for adjusting the wavelength dispersion property or photoelastic coefficient of the retardation film. In the specification of the present invention, the term "styrene-based resin" refers to a polymer obtained through polymerization of a styrene-based monomer. Examples of the styrene-based resin include: polystyrene; an acrylonitrile/styrene copolymer; an acrylonitrile/butadiene/styrene copolymer; an acrylonitrile/ethylene/styrene copolymer; a styrene/maleimide copolymer; a styrene/maleic anhydride copolymer; and a styrene/methyl methacrylate copolymer.

The styrene-based resin has a weight average molecular weight (Mw) within a range of preferably 1,000 to 400,000, and more preferably 2,000 to 300,000 measured through a gel permeation chromatography (GPC) method by using a tetrahydrofuran solvent. A weight average molecular weight within the above ranges may provide a styrene-based resin having favorable solubility, forming property, and operability in extrusion.

A content of the styrene-based resin is preferably 10 parts by weight to 50 parts by weight, and more preferably 20 parts by weight to 40 parts by weight with respect to 100 parts by weight of a solid content in the retardation film. A content of the styrene-based resin within the above ranges may provide a retardation film having a small photoelastic coefficient, favorable wavelength dispersion property, and excellent durability, mechanical strength, and transparency.

The retardation film to be used for the positive A plate is particularly preferably a stretched film of a polymer film containing as a main component a resin composition containing a styrene-based resin and another thermoplastic resin. The other thermoplastic resin may appropriately be selected from the materials described in the above section C-4. The other thermoplastic resin is preferably a cycloolefin-based resin, and particularly preferably a cycloolefin-based resin obtained through hydrogenation of a ring-opened polymer of a norbornene-based monomer. A stretched film of a polymer film containing as a main component a resin composition containing a styrene-based resin and a cycloolefin-based resin has a small photoelastic coefficient, excellent wavelength dispersion property, and excellent durability, mechanical strength, and transparency.

The cycloolefin-based resin having a hydrogenated ring-opened polymer of a norbornene-based monomer may be obtained by: performing a metathesis reaction of a norbornene-based monomer to obtain a ring-opened polymer; and hydrogenating the ring-opened polymer. For example, the resin may be produced through a method described in "Optical Polymer Zairyo No Kaihatsu/Ouyougijutsu", published by NTS Inc., p. 103 to p. 111 (2003).

Examples of the norbornene-based monomer include: norbornene; norbornene alkyl derivatives such as 5-methyl-2-norbornene, 5-ethyl-2-norbornene, and 5-dimethyl-2-norbornene; a norbornene alkylidene derivative such as 5-ethylidene-2-norbornene; dicyclopentadiene derivatives such as dicyclopentadiene and 2,3-dihydrodicyclopentadinene; and octahydronaphthalene derivatives such as 1,4:5,8-dimethano-1,4,4a,5,6,7,8a-octahydronaphthalene and 6-methyl-1,4:5,8-dimethano-1,4,4a,5,6,7,8a-octahydronaphthalene.

The cycloolefin-based resin having a hydrogenated ring-opened polymer of a norbornene-based monomer has a hydrogenation rate of generally 90% or more, preferably 95% or more, and more preferably 99% or more from the viewpoints of heat resistance and light resistance.

The cycloolefin-based resin having a hydrogenated ring-opened polymer of a norbornene-based monomer has a weight average molecular weight (Mw) of preferably 20,000 to 300,000, more preferably 30,000 to 200,000, determined through gel permeation chromatography (GPC) by using a tetrahydrofuran solvent. A weight average molecular weight within the above ranges can provide a polymer film having excellent mechanical strength, solubility, forming property, and extrusion workability.

A method of obtaining the polymer film containing as a main component a thermoplastic resin to be used for the positive A plate may be the same as the forming method described in the above section C-4. Among those, an extrusion is preferred because a retardation film having excellent smoothness and optical uniformity may be obtained. To be specific, the extrusion is a method involving: melting under heating a resin composition containing a thermoplastic resin as a main component, additives, and the like; extruding the resin composition into a sheet on a surface of a casting roll by using a T-die or the like; and cooling the resultant to form a film. In the case where two or more kinds of resins are blended and used, a method of mixing the resins is not particularly limited. In the case where the extrusion is employed, for example, the resins may be mixed in a predetermined ratio and melted for uniform mixing.

The conditions to be employed for formation of the polymer film containing as a main component a thermoplastic resin may appropriately be selected in accordance with the composition or type of the resin, a forming method, and the like. In the case where the extrusion is employed, a preferred method involves: discharging a resin melted under heating to 240° C. to 300° C. into a sheet; and gradually cooling the resultant from a high temperature to a low temperature by using a take-off roll (cooling drum) or the like. The above-mentioned conditions are selected, to thereby provide a retardation film having desired Re[590] and Rth[590] and excellent smoothness and optical uniformity.

The polymer film containing as a main component a thermoplastic resin may further contain any appropriate additive. Specific examples of the additive include a plasticizer, a heat stabilizer, a light stabilizer, a lubricant, an antioxidant, a UV absorber, a flame retardant, a colorant, an antistatic agent, a compatibilizing agent, a crosslinking agent, and a tackifier. The type and amount of the additive to be used may appropriately be set in accordance with the purpose. For example, a use amount of the additive is preferably more than 0 and 10 parts by weight or less, more preferably more than 0 and 5 parts by weight or less, and most preferably more than 0 and 3 parts by weight or less with respect to 100 parts by weight of the thermoplastic resin.

Any appropriate stretching method may be employed as a method of stretching a polymer film containing as a main component a thermoplastic resin. Specific examples of the stretching method include: a longitudinal uniaxial stretching method; a transverse uniaxial stretching method; a longitudinal and transverse simultaneous biaxial stretching method; and a longitudinal and transverse sequential biaxial stretching method. Any appropriate stretching machine such as a roll stretching machine, a tenter stretching machine, or a biaxial stretching machine may be used as stretching means. In the heat stretching, temperature may be continuously changed or may be changed in steps, or stretching and shrinking or relaxation may be performed in combination. The stretching may be performed in two or more steps. A stretching direction may be in a longitudinal direction (machine direction (MD)) of a film or in a width direction (transverse direction (TD)) of the film. The stretching may be performed in an oblique direction (oblique stretching) through a stretching method described in FIG. 1 of JP-A-2003-262721. Re[590] and Rth[590] of the retardation film to be used for the positive A plate may appropriately be adjusted by selecting the retardation values and thickness of the film before stretching, the stretching ratio, the stretching temperature, and the like.

The polymer film before stretching preferably has as equal in-plane and thickness direction retardation values as possible. To be specific, the polymer film before stretching preferably has an absolute value of a difference (|Rth[590]−Re[590]|) between Re[590] and Re[590] of 5 nm or less. The polymer film before stretching more preferably has small equal in-plane and thickness direction retardation values. To be specific, Re[590] and Rth[590] of the polymer film before stretching are each 10 nm or less, more preferably 5 nm or less, and most preferably 2 nm or less. Re[590] and Rth[590] of the polymer film before stretching is preferably adjusted during film formation from the viewpoints of economical efficiency and operability. However, in the case where Re[590] and Rth[590] of the polymer film differ from each other after film formation, Re[590] and Rth[590] of the polymer film may be adjusted by subjecting the polymer film to fabrication such as stretching treatment, shrinking (or relaxation) treatment, or heat relaxation treatment.

A temperature inside a stretching oven (also referred to as stretching temperature) during stretching of the polymer film containing as a main component a thermoplastic resin is preferably equal to or higher than a glass transition temperature (Tg) of the polymer film because retardation values easily even out in a width direction and the film hardly crystallizes (becomes clouded). The stretching temperature is preferably Tg+1° C. to Tg+30° C. The stretching temperature is typically 110 to 200° C., and more preferably 120 to 170° C. The glass transition temperature can be determined through a method in accordance with JIS K7121-1987 by differential scanning calorimetry (DSC).

A specific method of controlling the temperature inside the stretching oven is not particularly limited, and may appropriately be selected from heating methods or temperature control methods using: an air-circulating thermostatic oven in which hot air or cool air circulates; a heater using microwaves, far infrared rays, or the like; a heated roll for temperature adjustment; a heat pipe roll; and a metallic belt.

The stretching ratio during stretching of the polymer film may appropriately be selected in accordance with the composition of the polymer film, the type of volatile components and the like, the residual amounts of the volatile components and the like, the retardation values to be designed, and the like. To be specific, the stretching ratio is generally more than 1 time to 3 times or less, preferably 1.1 times to 2 times, and more preferably 1.2 times to 1.8 times of the original length. A delivery speed during stretching is not particularly limited, but is preferably 1 m/minute to 20 m/minute in consideration of the machine accuracy, stability, and the like of the stretching machine.

The retardation film to be used for the positive A plate may employ a liquid crystal composition. In the case where the liquid crystal composition is employed, the retardation film to be used for the positive A plate is preferably a solidified layer or cured layer of a liquid crystal composition containing a liquid crystal compound in homogeneous alignment. In the specification of the present invention, the term "homogeneous alignment" refers to a state where the liquid crystal compound is aligned parallel to the plane of the film and in the same direction. Note that the liquid crystal composition and liquid crystal compound to be used for the positive A plate may be the same as those described in the above section C-4.

A retardation film formed of the solidified layer or cured layer of a liquid crystal composition containing a liquid crystal compound in homogeneous alignment may be obtained through a method described in JP-A-2002-156526, for example.

A thickness of the retardation film formed of the solidified layer or cured layer of a liquid crystal composition containing a liquid crystal compound in homogeneous alignment to be used for the positive A plate is preferably 1 µm to 20 µm, and more preferably 1 µm to 10 µm. A thickness thereof within the above ranges may provide a thin retardation film having excellent optical uniformity and satisfying the optical properties described in the above section D-1.

E. Positive C Plate

In the specification of the present invention, the term "positive C plate" refers to a positive uniaxial optical element satisfying a refractive index profile of nz>nx=ny. Ideally, the positive uniaxial optical element satisfying a refractive index profile of nz>nx=ny has an optical axis in a normal line direction. In the specification of the present invention, nx=ny not only refers to a case where nx and ny are completely equal but also includes a case where nx and ny are substantially equal. The phrase "case where nx and ny are substantially equal" includes a case where an in-plane retardation value (Re[590]) is 10 nm or less, for example.

Referring to FIGS. 1(a) to 1(c) and 2(a) to 2(c), the positive C plate 50 is arranged between the positive A plate 40 and the liquid crystal cell 100. As shown in FIG. 2(a), the positive C plate 50 is preferably arranged between the positive A plate 40 and the liquid crystal cell 100 without the negative C plate 30 arranged therebetween. According to this embodiment, the negative C plate 30 also serves as a protective layer of a liquid crystal side of the polarizer 20 such that a display screen may maintain uniformity for a long period of time even in the case where the polarizing element of the present invention is used for a liquid crystal display apparatus in a high temperature and high humidity environment.

<E-1. Optical Properties of Positive C Plate>

$Re_{PC}[590]$ of the positive C plate to be used in the present invention is preferably 5 nm or less, and more preferably 2 nm or less. Note that a theoretical lower limit of $Re_{PC}[590]$ of the positive C plate is 0 nm.

$Rth_{PC}[590]$ of the positive C plate is −60 nm or less, preferably −350 nm to −60 nm, and more preferably −310 nm to −60 nm. Specifically referring to FIGS. 2(a) to 2(c), $Rth_{PC}[590]$ of the positive C plate in the polarizing element of the present invention according to an embodiment shown in FIG. 2(a) is preferably −230 nm to −60 nm, more preferably −190 nm to −60 nm, and particularly preferably −160 nm to −60 nm. $Rth_{PC}[590]$ of the positive C plate in the polarizing element of the present invention according to an embodiment shown in FIG. 2(b) or 2(c) is preferably −350 nm to −80 nm, more preferably −310 nm to −80 nm, and most preferably −270 nm to −80 nm. $Rth_{PC}[590]$ within the above ranges provides a synergetic effect of exhibiting the functions of the respective optical elements, and allows increase in a contrast ratio in an oblique direction and reduction in a color shift in an oblique direction of a liquid crystal display apparatus.

In addition, $Rth_{PC}[590]$ of the positive C plate is preferably adjusted such that a sum ($Rth_{add}$) of $Rth_{NC}[590]$ of the negative C plate and $Rth_{PC}[590]$ of the positive C plate is adjusted within the range described in the above section C-1.

<E-2. Means for Arranging Positive C Plate>

Referring to FIGS. 2(a) to 2(c), any appropriate method may be employed as a method of arranging the positive C plate 50 between the positive A plate 40 and the liquid crystal cell 100. Preferably, the positive C plate 50 is provided with an adhesive layer (not shown) on each side and is attached to the liquid crystal cell 100, the positive A plate 40, or the negative C plate 30. In this way, gaps among the optical elements are filled with the adhesive layers, thereby being capable of preventing shift in relationships among optical axes of the respective optical elements, and of preventing damages on the optical elements due to abrasion of the respective optical elements upon incorporating into the liquid crystal display apparatus. In addition, adverse effects of reflection or refraction that generates on the interface among the respective optical elements can be reduced, to thereby allow increase in contrast ratios in frontal and oblique directions of a liquid crystal display apparatus.

The thickness of the adhesive layer and the material used for forming the adhesive layer may appropriately be selected from those as described in the above section B-2 or the ranges and materials as described in the above section C-2.

In the case where nx and ny are completely equal, the positive C plate 50 has no in-plane retardation value and a slow axis is not detected. Thus, the positive C plate may be arranged independently of an absorption axis of the polarizer 20 and a slow axis of the positive A plate. In the case where nx and ny are substantially equal but slightly different, the slow axis may be detected. In this case, the positive C plate 50 is preferably arranged such that its slow axis is substantially parallel or substantially perpendicular to the absorption axis of the polarizer 20. An angle greatly departing from the above ranges tends to provide a liquid crystal display apparatus having reduced contrast ratios in frontal and oblique directions.

<E-3. Structure of Positive C Plate>

A structure (laminate structure) of the positive C plate is not particularly limited as long as the optical properties as described in the above section E-1 are satisfied. The positive C plate may be a single retardation film, or a laminate of two or more retardation films. The positive C plate is preferably a single retardation film for reducing shift or unevenness in retardation values due to shrinkage stress of the polarizer or heat of backlight and which may reduce the thickness of a liquid crystal panel. The positive C plate as a laminate may include an adhesive layer for attaching two or more retardation films. In a case where the laminate includes two or more retardation films, the retardation films may be identical to or different from each other. Details of the retardation film will be described below in E-4.

Rth[590] of the retardation film to be used for the positive C plate may appropriately be selected in accordance with the number of the retardation films. In the case where the positive C plate is formed of a single retardation film, for example, Rth[590] of the retardation film is preferably equal to $Rth_{PC}[590]$ of the positive C plate. Thus, retardation values of adhesive layers to be used for laminating the positive C plate to the positive A plate and the liquid crystal cell are preferably as small as possible. Further, in the case where the positive C plate is a laminate including two or more retardation films, for example, the laminate is preferably designed such that total Rth[590] of the retardation films is equal to $Rth_{PC}[590]$ of the positive C plate. To be more specific, for example, a positive C plate having $Rth_{PC}[590]$ of −100 nm can be obtained by laminating two retardation films each having Rth[590] of −50 nm. Meanwhile, such the positive C plate can be obtained by laminating a retardation film having Rth[590] of −20 nm and a retardation film having Rth[590] of −80 nm. In this case, the two retardation films are preferably laminated such that the respective slow axes are perpendicular to each other because the in-plane retardation value can be reduced. Note that only the positive C plate formed of two or less retardation films was described for clarification, but the present invention may obviously be applied to a laminate including three or more retardation films.

A total thickness of the positive C plate is preferably 0.5 μm to 200 μm, more preferably 1 μm to 150 μm, and most preferably 3 μm to 100 μm. A thickness within the above ranges can provide an optical element having excellent optical uniformity.

<E-4. Retardation Film to be Used for Positive C Plate>

The retardation film to be used for the positive C plate preferably has excellent transparency, mechanical strength, heat stability, water barrier property, and the like. Preferably, the retardation film to be used for the positive C plate is a solidified layer or cured layer of a liquid crystal composition containing a liquid crystal compound in homeotropic alignment. In the specification of the present invention, the term "homeotropic alignment" refers to a state where the liquid crystal compound in the liquid crystal composition is aligned uniformly and parallel to a normal line direction of the film. Note that the liquid crystal composition and liquid crystal compound to be used for the positive C plate may be the same as those described in the above section C-4.

More preferably, the retardation film to be used for the positive C plate is a solidified layer or cured layer of a liquid crystal composition containing a liquid crystal compound in homeotropic alignment, and the liquid crystal composition contains low molecular weight liquid crystals having at least one polymerizable or crosslinkable functional group in a part of a molecular structure. Particularly preferably, the liquid crystal composition contains low molecular weight liquid crystals having at least two polymerizable or crosslinkable functional groups in a part of a molecular structure. Such a liquid crystal compound may be used to polymerize (or crosslink) the polymerizable (or crosslinkable) functional groups through a polymerization (or crosslinking) reaction. Thus, mechanical strength of a retardation film increases, and a retardation film having excellent durability and dimensional stability may be obtained. Examples of low molecular weight liquid crystals having one mesogen group and two polymerizable functional groups in a part of a molecular structure include: "Paliocolor LC242", trade name, available from BASF Aktiengesellschaft (Δn=0.131); and "CB483", trade name, available from Huntsman International LLC. (Δn=0.080).

Any appropriate functional group may be selected as the polymerizable functional group, and examples thereof include an acryloyl group, a methacryloyl group, an epoxy group, and a vinylether group. Of those, an acryloyl group and a methacryloyl group are preferably used from the viewpoint of being highly reactive and providing a retardation film having excellent transparency.

A thickness of the retardation film formed of a solidified layer or cured layer of a liquid crystal composition containing a liquid crystal compound in homeotropic alignment may vary depending on the retardation values to be designed, but is preferably 0.6 μm to 20 μm, more preferably 0.8 μm to 10 μm, and most preferably 0.8 μm to 2.5 μm. A thickness thereof within the above ranges may provide a retardation film having excellent productivity or operability in film formation, sufficient mechanical strength for practical use, and excellent optical uniformity.

A difference (also referred to as a birefringence (Δn), Δn=ne−no) between a refractive index of extraordinary ray (ne) and a refractive index of ordinary ray (no) measured at a wavelength of 589 nm at 23° C. of the retardation film formed of a solidified layer or cured layer of a liquid crystal composition containing a liquid crystal compound in homeotropic alignment is preferably −0.20 to −0.04, more preferably −0.18 to −0.05, and most preferably −0.14 to −0.07. A retardation film having a birefringence within the above ranges may be used, to thereby satisfy the optical properties described in the above section E-1 and adjust the thickness of the retardation film within the range proving excellent productivity and operability.

The retardation film formed of a solidified layer or cured layer of a liquid crystal composition containing a liquid crystal compound in homeotropic alignment has a transparency of preferably 80% or more, more preferably 85% or more, and particularly preferably 90% or more measured by using light of a wavelength of 590 nm at 23° C. The positive C plate preferably has a similar transparency. Note that a theoretical upper limit of the transparency is 100%.

The retardation film formed of a solidified layer or cured layer of a liquid crystal composition containing a liquid crystal compound in homeotropic alignment may further contain polymer liquid crystals represented by the following general formula (I). The polymer liquid crystals are used for improving alignment property of the liquid crystal compound.

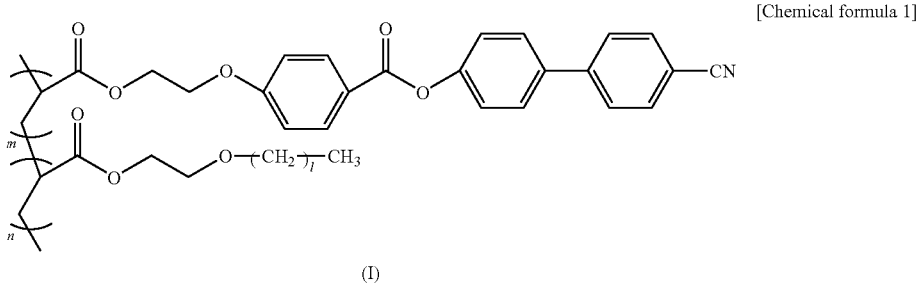

[Chemical formula 1]

(I)

In the general formula (I), l represents an integer of 14 to 20. When a sum of m and n is 100, m is 50 to 70 and n is 30 to 50.

A content of the polymer liquid crystals is preferably 10 parts by weight to 40 parts by weight, and more preferably 15 parts by weight to 30 parts by weight with respect to 100 parts by weight of a total solid content in the retardation film formed of a solidified layer or cured layer of a liquid crystal composition containing a liquid crystal compound in homeotropic alignment.

The retardation film formed of a solidified layer or cured layer of a liquid crystal composition containing a liquid crystal compound in homeotropic alignment may be obtained through Steps 1 to 3 described below, for example. To be specific, the retardation film may be obtained through: a step of subjecting a surface of a substrate (also referred to as a support) to vertical alignment treatment (Step 1); a step of applying a solution or dispersion of a liquid crystal composition to the surface of the substrate subjected to the vertical alignment treatment for homeotropic alignment of a liquid crystal compound in the liquid crystal composition (Step 2); and a step of drying the liquid crystal composition for solidification (Step 3). A method of forming the retardation film preferably includes a step of irradiating the liquid crystal composition with UV rays for curing (Step 4) after Steps to 3. Note that the substrate is generally peeled off before the retardation film is applied to practical use.

Figure 5:
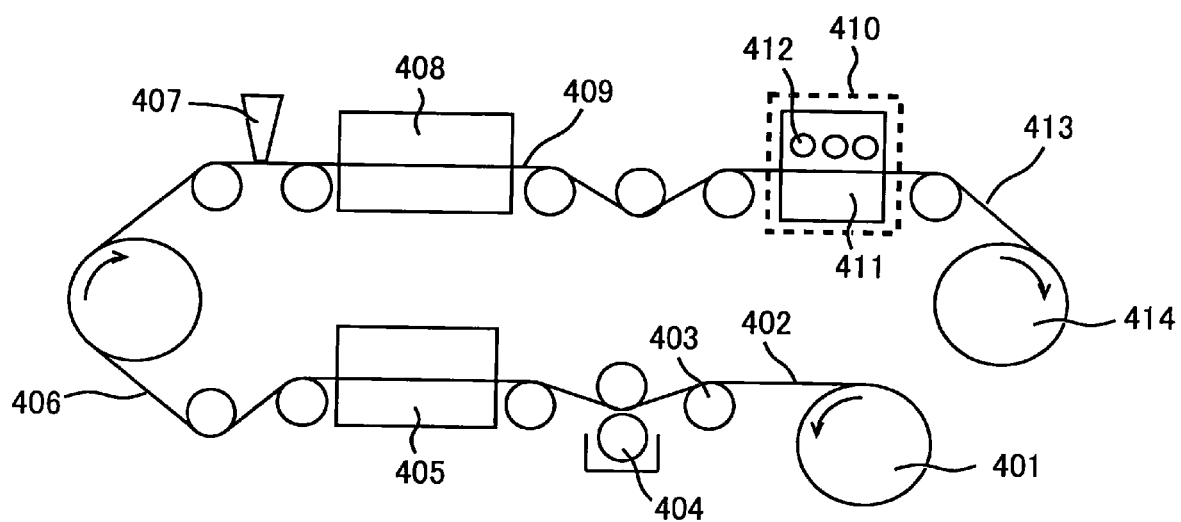
[FIG. 5] A schematic diagram explaining a scheme of a method of producing a retardation film to be used for a positive C plate.

FIG. 5 is a schematic diagram explaining a scheme of a method of producing a retardation film to be used for a positive C plate according to a preferred embodiment of the present invention. In this step, a substrate 402 is supplied from a delivery part 401 and delivered by a guide roll 403 to a first coater part 404, where a solution or dispersion of an alignment agent is applied. The substrate having the alignment agent applied is delivered to a first drying means 405, where a solvent is evaporated and an alignment agent layer (also referred as alignment film) is formed thereon. Next, a solution or dispersion of a liquid crystal composition is applied to the substrate 406 having the alignment film formed on its surface in a second coating part 407, and a solvent is evaporated with a second drying means 408, to thereby form a solidified layer of a liquid crystal composition containing a liquid crystal compound in homeotropic alignment. Next, the substrate 409 having the solidified layer of a liquid crystal composition containing a liquid crystal compound in homeotropic alignment formed thereon is delivered to a UV irradiation part 410, where a surface of the solidified layer is irradiated with UV rays, to thereby form a cured layer of a liquid crystal composition containing a liquid crystal compound in homeotropic alignment. Note that the UV irradiation part 410 is typically provided with a UV lamp 412 and a temperature control means 411. Then, the substrate 413 having the cured layer formed thereon is taken-up in a take-up part 414 and is supplied to a step of producing a polarizing element (step of attaching the cured layer to a polarizer).

The substrate to be used in Step 1 (step of subjecting a surface of a substrate to vertical alignment treatment) is used for thinly and uniformly flow casting the solution or dispersion of a liquid crystal composition. Any appropriate material may be selected as a material used for forming the substrate. Specific examples thereof include: a glass substrate such as a glass sheet or a quarts substrate; a polymer substrate such as a film or a plastic substrate; a metal substrate formed of aluminum, iron, or the like; an inorganic substrate such as a ceramics substrate; and a semiconductor substrate such as a silicon wafer. The substrate is preferably a polymer substrate because the polymer substrate may provide excellent smoothness on a substrate surface or excellent wetness to a liquid crystal composition, and may allow continuous production with a roll to thereby significantly improve productivity. Note that the substrate is generally peeled off before the retardation film is applied to practical use.

Examples of a material used for forming the polymer substrate include a thermosetting resin, a UV-curable resin, a thermoplastic resin, a thermoplastic elastomer, and a biodegradable plastic. Of those, the thermoplastic resin is preferably used. The thermoplastic resin may be a non-crystalline polymer or a crystalline polymer. The non-crystalline polymer has an advantage of excellent transparency and thus may be used for a liquid crystal panel or the like as it is without peeling off the retardation film from the substrate. Meanwhile, the crystalline polymer has an advantage of excellent rigidity, strength, and chemical resistance and thus provides excellent production stability in production of the retardation film. The polymer substrate may also serve as the retardation film to be used for the positive A plate or the negative C plate in the present invention. Referring to FIG. 2(a) or 2(b), for example, a stretched film of a polymer film containing as a main component a thermoplastic resin may be used as the positive A plate 40 serving as a substrate (support), and a solidified layer or cured layer (eventually, the positive C plate 50) of a liquid crystal composition containing a liquid crystal compound in homeotropic alignment may be formed on a surface of the substrate. Referring to FIG. 2(b) or 2(c), a polymer film containing as a main component a thermoplastic resin may be used as the negative C plate 30 serving as a substrate (support), and a solidified layer or cured layer (eventually, the positive C plate 50) of a liquid crystal composition containing a liquid crystal compound in homeotropic alignment may be formed on a surface of the substrate.

The vertical alignment treatment is used for homeotropic alignment of the liquid crystal compound in the liquid crystal composition. Any appropriate method may be employed as the vertical alignment treatment. A preferred example of the method involves adsorbing an alignment agent on a surface of a substrate to form a layer of an alignment agent (also referred to as an alignment film). In this way, a retardation film having extremely few alignment defects (disclination) of the liquid crystal compound can be produced.

In the vertical alignment treatment, examples of the method of adsorbing an alignment agent on a surface of a substrate include a solvent coating method, a plasma polymerization method, and a sputtering method. The solution coating method is preferred because the method provides excellent continuous productivity, operability, and economical efficiency and allows uniform alignment of the liquid crystal compound. In the specification of the present invention, the term "solution coating method" refers to a method involving applying a solution or dispersion of an alignment agent on a surface of a substrate and drying the solution or dispersion to form an alignment film.

Any appropriate alignment agent may be used for the vertical alignment treatment. Specific examples thereof include lecithin, stearic acid, hexadecyl trimethyl ammonium bromide, octadecylamine hydrochloride, a monobasic chromium carboxylate complex (such as a chromium myristate complex or a chromium perfluorononanoate complex), an organic silane (such as a silane coupling agent or siloxane), perfluorodimethylcyclohexane, tetrafluoroethylene, and polytetrafluoroethylene. Of those, an organic silane is particularly preferably used as the alignment agent because of its excellent workability, product quality, and alignment property of the liquid crystal compound. A specific example of the organic silane as the alignment agent is "Ethyl silicate", trade name, available from COLCOAT Co., Ltd., containing tetraethoxysilane as a main component.

For a method of preparing the solution or dispersion of an alignment agent, a solution or dispersion of a commercially available alignment agent may be used as it is, or a solvent may be added to a solution or dispersion of a commercially available alignment agent. Alternatively, a solid content of an alignment agent may be dissolved in various solvents, or the alignment agent, various additives, and a solvent may be mixed to be dissolved.

A total solid content in the solution of the alignment agent may vary depending on solubility, application viscosity, wetness on a substrate, thickness after application, and the like. However, the total solid content is generally 0.05 to 20 parts by weight, more preferably 0.5 to 10 parts by weight, and particularly preferably 1 to 5 parts by weight with respect to 100 parts by weight of the solvent. A total solid content within the above ranges may provide a retardation film having high surface uniformity.

The solvent to be used for the alignment agent preferably employs a liquid substance capable of uniformly dissolving the alignment agent into a solution. The solvent may be a nonpolar solvent such as benzene or hexane, or a polar solvent such as water or alcohol. Further, the solvent may be: an inorganic solvent such as water; or an organic solvent such as alcohols, ketones, ethers, esters, aliphatic and aromatic hydrocarbons, halogenated hydrocarbons, amides, and cellosolves. The solvent is preferably at least one solvent selected from cyclopentanone, cyclohexanone, methyl ethyl ketone, and tetrahydrofuran. Those solvents are preferred because the solvents each do not corrode the substrate to provide adverse effects for practical use and are each capable of sufficiently dissolving the alignment agent.

For a method of applying the solution or dispersion of the alignment agent, any appropriate application method employing a coater may be selected. Specific examples of the coater include a reverse roll coater, a positive rotation roll coater, a gravure coater, a knife coater, a rod coater, a slot orifice coater, a curtain coater, a fountain coater, an air doctor coater, a kiss coater, a dip coater, a bead coater, a blade coater, a cast coater, a spray coater, a spin coater, an extrusion coater, and a hot melt coater. Of those, preferred examples of the coater include a reverse roll coater, a positive rotation roll coater, a gravure coater, a rod coater, a slot orifice coater, a curtain coater, a fountain coater, and a spin coater. An application method employing the above-mentioned coater can provide an extremely thin alignment film having excellent uniformity.

A method of drying the solution or dispersion of an alignment agent (also referred to as drying means) may appropriately be selected from, for example, heating methods or temperature control methods using: an air-circulating thermostatic oven in which hot air or cool air circulates; a heater using microwaves, far infrared rays, or the like; a heated roll for temperature adjustment; a heat pipe roll; and a metallic belt.

A temperature for drying the solution or dispersion of an alignment agent is preferably a glass transition temperature (Tg) of the substrate or lower. To be specific, the drying temperature is preferably 50° C. to 180° C., and more preferably 80° C. to 150° C. A drying time is 1 minute to 20 minutes, for example, preferably minute to 10 minutes, and more preferably 1 minute to 5 minutes.

In Step 2 (the step of applying a solution or dispersion of a liquid crystal composition to a surface of the substrate subjected to the vertical alignment treatment for homeotropic alignment of a liquid crystal compound in the liquid crystal composition), the method of applying a solution or dispersion of a liquid crystal composition may appropriately be selected from methods similar to the above-mentioned methods of applying an alignment agent.

For a method of preparing the solution or dispersion of a liquid crystal composition, a solution or dispersion of a commercially available liquid crystal composition may be used as it is, or a solvent may be added to a solution or dispersion of a commercially available liquid crystal composition. Alternatively, a solid content of a liquid crystal composition may be dissolved in various solvents, or the liquid crystal composition, various additives, and a solvent may be mixed to be dissolved.

A total solid content in the solution of the liquid crystal composition may vary depending on solubility, application viscosity, wetness on a substrate, thickness after application, and the like. However, the total solid content is preferably 10 to 100 parts by weight, more preferably 20 to 80 parts by weight, and particularly preferably 30 to 60 parts by weight with respect to 100 parts by weight of the solvent. A total solid content within the above ranges may provide a retardation film having high surface uniformity.

The solvent to be used for the liquid crystal composition preferably employs a liquid substance which is capable of uniformly dissolving the liquid crystal compound into a solution and which hardly dissolves the alignment film. The solvent is preferably at least one solvent selected from cyclopentanone, cyclohexanone, methyl isobutyl ketone, toluene, and ethyl acetate. Those solvents are preferred because the solvents each do not corrode the substrate to provide adverse effects for practical use and are each capable of sufficiently dissolving the liquid crystal composition.

In Step 3 (a step of drying a liquid crystal composition for solidification), a method of drying the liquid crystal composition (also referred to as drying means) may appropriately be selected from, for example, heating methods or temperature control methods using: an air-circulating thermostatic oven in which hot air or cool air circulates; a heater using microwaves, far infrared rays, or the like; a heated roller for temperature adjustment; a heat pipe roll; and a metallic belt.

A temperature for drying the liquid crystal composition is preferably within a temperature range in which the liquid crystal composition exhibits a liquid crystal phase and a glass transition temperature (Tg) of the substrate or lower. To be specific, the drying temperature is preferably 50° C. to 130° C., and more preferably 70° C. to 120° C. A drying time is generally 1 minute to 20 minutes, preferably 1 minute to 10 minutes, and more preferably 1 minute to 5 minutes. Under the above-mentioned conditions, a retardation film having high uniformity may be produced.

The method of forming the retardation film to be used for the positive C plate preferably includes a step of irradiating the liquid crystal composition with UV rays for curing (Step 4) after Steps 1 to 3. In this case, the liquid crystal composition preferably contains low molecular weight liquid crystals (liquid crystal compound) having at least one polymerizable or crosslinkable functional group in a part of a molecular structure. The liquid crystal compound is polymerized or crosslinked, to thereby increase mechanical strength of a retardation film and provide a retardation film having excellent durability and dimensional stability.

A method of curing the liquid crystal composition may appropriately be selected from methods each using an irradiation device employing as a light source such as an ultrahigh pressure mercury lamp, a dielectric excimer discharge lamp, a flash UV lamp, a high pressure mercury lamp, a low pressure mercury lamp, a deep UV lamp, a xenon lamp, a xenon flash lamp, or a metal halide lamp.

A wavelength of a light source to be used for the irradiation of UV rays may be determined in accordance with a wavelength region in which the polymerizable or crosslinkable functional group of the liquid crystal compound exhibits optical absorption. The wavelength region of a light source is generally 210 nm to 380 nm, and more preferably 250 nm to 380 nm. A vacuum UV region of 100 nm to 200 nm is preferably cut with a filter or the like from the wavelength region of the light source for suppressing a photodecomposition reaction of the liquid crystal compound. A wavelength region of a light source within the above ranges may allow sufficient curing of the liquid crystal compound through a polymerization or crosslinking reaction and may provide a retardation film having excellent mechanical strength.

An irradiation amount of the UV rays measured at a wavelength of 365 nm is preferably 30 mJ/cm$^2$ to 1,000 mJ/cm$^2$, more preferably 50 mJ/cm$^2$ to 800 mJ/cm$^2$, and particularly preferably 100 mJ/cm$^2$ to 500 mJ/cm$^2$. An irradiation amount within the above ranges may allow sufficient polymerization or crosslinking of the liquid crystal composition through a polymerization or crosslinking reaction and may provide a retardation film having excellent mechanical strength.

A temperature (also referred to as an irradiation temperature) inside an irradiation device during the irradiation of UV rays is preferably held at a liquid crystal phase-isotropic phase transition temperature (Ti) of the liquid crystal composition or lower. The irradiation temperature is more preferably held at Ti−5° C. or lower, and particularly preferably Ti−10° C. or lower. To be specific, the irradiation temperature is preferably 15° C. to 90° C., and more preferably 15° C. to 60° C. An irradiation temperature within the above ranges may provide a retardation film having high uniformity.

A method of holding the irradiation temperature constant (also referred to as temperature control means) may appropriately be selected from, for example, heating methods or temperature control methods using: an air-circulating thermostatic oven in which hot air or cool air circulates; a heater using microwaves, far infrared rays, or the like; a heated roll for temperature adjustment; a heat pipe roll; and a metallic belt.

F. Overview of Liquid Crystal Panel

The polarizing element of the present invention is arranged on at least one side of the liquid crystal cell and used as a liquid crystal panel. The polarizing element is preferably arranged on a viewer side of the liquid crystal cell for increasing a contrast in an oblique direction of a liquid crystal display apparatus. The type of liquid crystal cell is not particularly limited, and a transmissive-type, reflective-type, or semi transmissive-type liquid crystal cell may be used.

Figure 6:
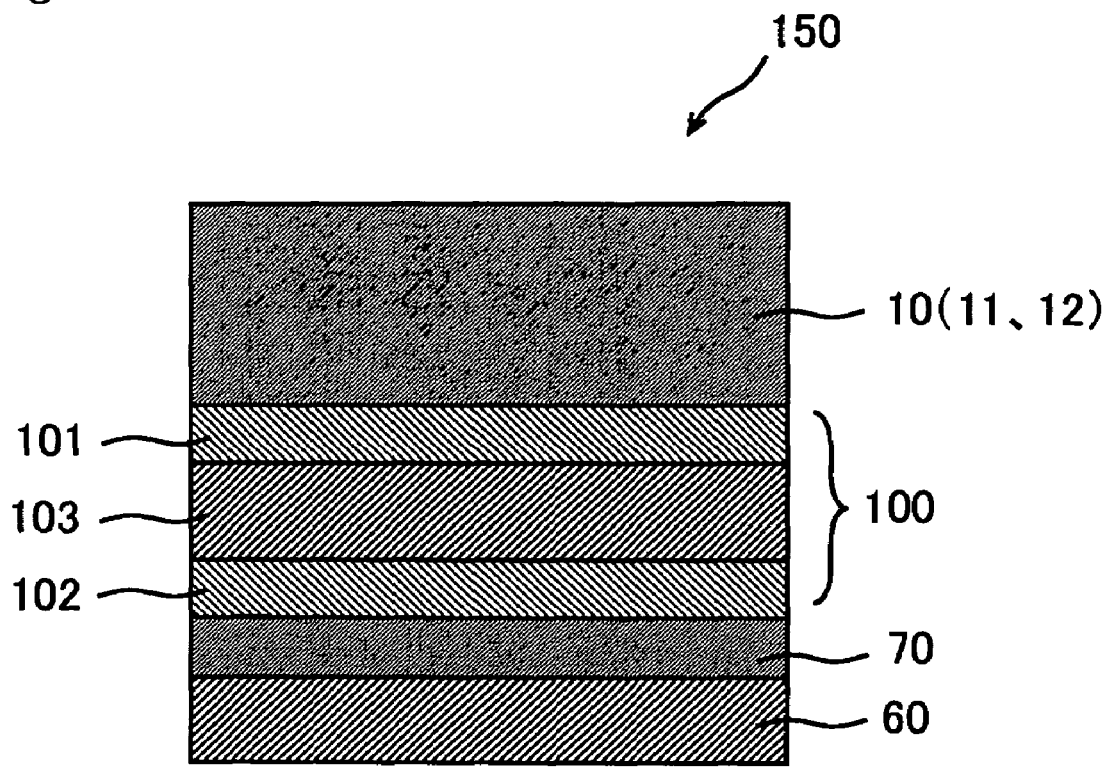
[FIG. 6] A schematic sectional view of a liquid crystal panel according to a preferred embodiment of the present invention.
Figure 7:
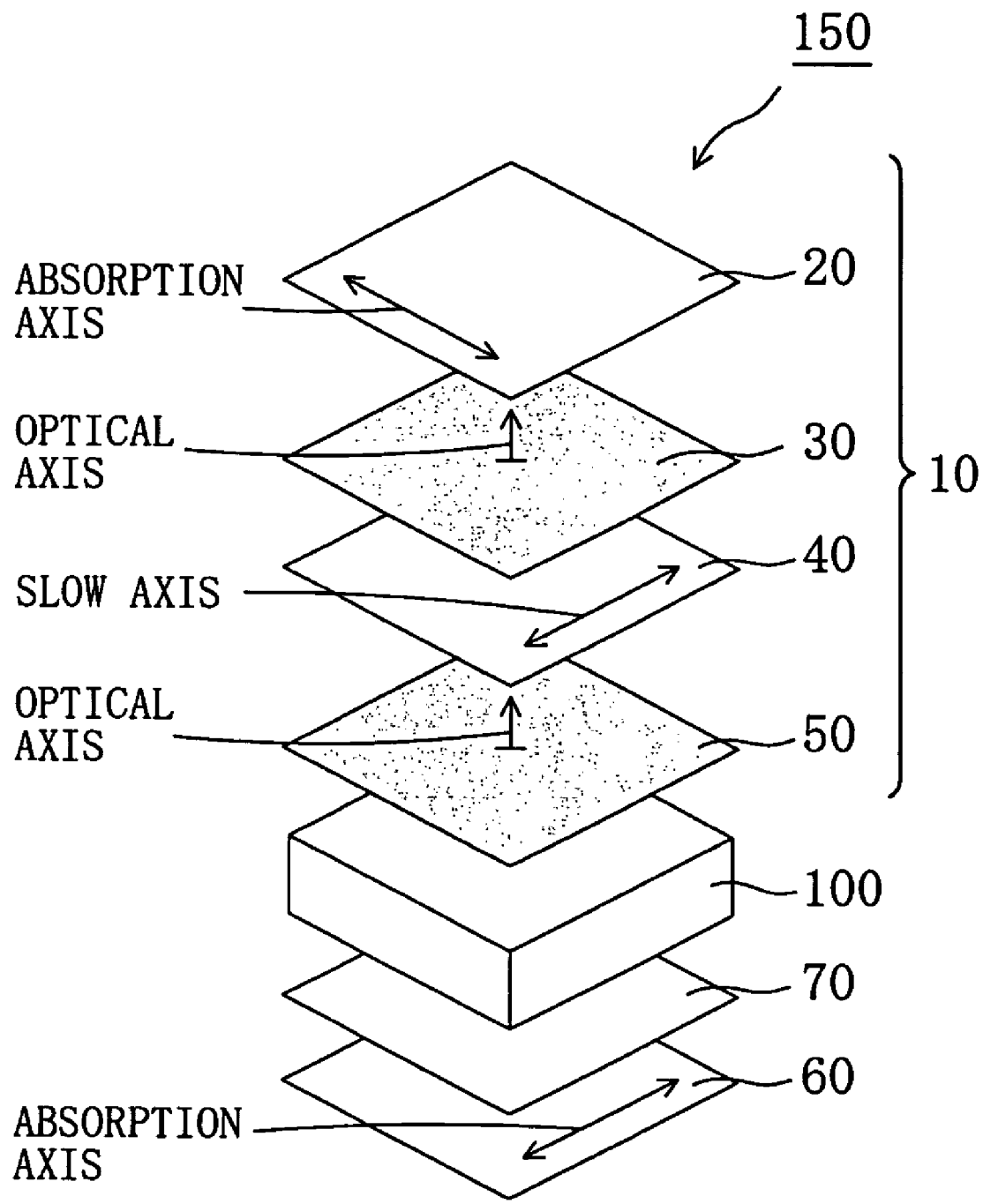
[FIG. 7] A schematic perspective view of the liquid crystal panel of FIG. 6.

FIG. 6 is a schematic sectional view of a liquid crystal panel according to a preferred embodiment of the present invention. FIG. 7 is a schematic perspective view of the liquid crystal panel. Note that ratios among length, width, and thickness of each member in FIGS. 6 and 7 are different from those of an actual member for clarity. A liquid crystal panel 150 is provided with: the liquid crystal cell 100; the polarizing element 10 of the present invention arranged on a viewer side of the liquid crystal cell 100; a second polarizer 60 arranged on a backlight side of the liquid crystal cell 100; and another retardation film 70 arranged between the liquid crystal cell 100 and the second polarizer 60. As shown in FIGS. 1(*a*) to 1(*c*), the polarizing element 10 includes a first polarizer 20 as its outermost layer. The first polarizer 20 and the second polarizer 60 are arranged such that respective absorption axes are perpendicular to each other. For practical use, any appropriate protective layers (not shown) may be arranged on outer sides of the first polarizer 20 and the second polarizer 60. Note that the liquid crystal panel of the present invention is not limited to the example in the figures, and any structural member such as a film or an adhesive layer (preferably having isotropic optical property) may be arranged between the structural members. FIG. 6 only shows a case where the polarizing element 10 is employed, but the polarizing elements 11 and 12 may be used to the liquid crystal cell in the same manner as in the examples shown in the figures. A polarizing element (polarizing element not shown in FIGS. 1(*a*) to 1(*c*)) according to another embodiment of the present invention may obviously be used.

G. Liquid Crystal Cell

Referring to FIG. 6, the liquid crystal cell 100 is provided with a pair of glass substrates (101 and 102), and a liquid crystal layer 103 as a display medium arranged between the substrates. One glass substrate (active matrix substrate) is provided with an active element (typically, TFT) for controlling electrooptic properties of liquid crystals, and a scanning line for providing a gate signal to this active element and a signal line for providing a source signal thereto (all not shown). The other glass substrate (color filter substrate) is provided with a colored layer as a color filter, a light shielding layer (also referred to as black matrix), and an ITO layer (all now shown). A distance (cell gap) between the two glass substrates is controlled by a spacer (not shown). An alignment film (not shown) formed of polyimide, for example, is provided on a side of each of the glass substrates in contact with the liquid crystal layer.

Examples of drive mode of the liquid crystal cell include twisted nematic (TN) mode, super twisted nematic (STN) mode, electrically controlled birefringence (ECB) mode, vertical alignment (VA) mode, in-plane switching (IPS) mode, optically compensated birefringence (OCB) mode, hybrid alignment nematic (HAN) mode, surface stabilized ferroelectric liquid crystal (SSFLC) mode, and antiferroelectric liquid crystal (AFLC) mode. The polarizing element of the present invention is preferably used for a liquid crystal cell of IPS mode, VA mode, or OCB mode. The polarizing element of the present invention is most preferably used for a liquid crystal cell of IPS mode.

A liquid crystal cell of twisted nematic (TN) mode refers to a liquid crystal cell including positive dielectric anisotropic nematic liquid crystals between two substrates, and having an alignment direction of liquid crystal molecules twisted by 90° through a surface alignment treatment of the glass substrates. Specific examples of the liquid crystal cell of TN mode include: a liquid crystal cell described in p. 158 of "Ekisho Jiten", published by Baifukan Co., Ltd. (1989); and a liquid crystal cell described in JP-A-63-279229.

A liquid crystal cell of vertical alignment (VA) mode refers to a liquid crystal cell utilizing an electrically controlled birefringence (ECB) effect and including negative dielectric anisotropic nematic liquid crystals vertically aligned between transparent electrodes under no application of a voltage. Specific examples of the liquid crystal cell of VA mode include liquid crystal cells described in JP-A-62-210423 and JP-A-04-153621. As described in JP-A-11-258605, the liquid crystal cell of VA mode may be a liquid crystal cell of multi-domain MVA mode which is provided with slits in pixels for expanding a viewing angle or is employing substrates each having protrusions on a surface. Further, as described in JP-A-10-123576, the liquid crystal cell of VA mode may be a liquid crystal cell of VATN mode in which a chiral agent is added into liquid crystals and nematic liquid crystals are substantially vertically aligned under no application of a voltage and twisted to form multi-domain alignment under application of a voltage.

In the IPS mode, homogeneously aligned nematic liquid crystals in a so-called sandwiched cell in the absence of an electric field respond in an electric field parallel to substrates (also referred to as a horizontal electric field) by utilizing an electrically controlled birefringence (ECB) effect. To be specific, as described in "Monthly Display July" (p. 83 to p. 88, published by Techno Times Co., Ltd., 1997) or "Ekisho vol. 2, No. 4" (p. 303 to p. 316, published by Japanese Liquid Crystal Society, 1998), completely black display is provided in the absence of an electric field by: adjusting a longitudinal axis of the liquid crystal molecules without application of an electric field, in a direction of an absorption axis of a polarizing plate from which light enters; and arranging polarizing plates above and below the liquid crystal cell to be perpendicular to each other. Under application of an electric field, liquid crystal molecules rotate while remaining parallel to substrates, to thereby obtain a transmittance in accordance with a rotation angle.

The liquid crystal cell of OCB mode refers to a liquid crystal cell utilizing an electrically controlled birefringence effect and inducing positive dielectric anisotropic nematic liquid crystals bend aligned with twisted alignment in a central part between transparent electrodes under no application of a voltage. The liquid crystal cell of OCB mode is also referred to as a "Π cell". Specific examples of the liquid crystal cell of OCB mode include: a liquid crystal cell described in p. 11 to 27 of "Jisedai Ekisho Display", published by Kyoritsu Shuppan Co., Ltd. (2000); and a liquid crystal cell described in JP-A-07-084254.

H. Other Retardation Film

In the present invention, any appropriate other retardation film may be employed in accordance with drive mode of the liquid crystal cell. Note that the other retardation film may be omitted or be replaced by an isotropic film in accordance with the drive mode of the liquid crystal cell. Referring to FIGS. 6 and 7, the other retardation film 70 is arranged between the liquid crystal cell 100 and the second polarizer 60. According to this embodiment, the other retardation film 70 also serves as a protective layer of a liquid crystal cell side of the second polarizer 60, to thereby contribute to reduction in thickness of a liquid crystal panel. Note that a position where the other retardation film 70 is arranged is not limited to the examples shown in the figures, and the other retardation film 70 may be arranged between the liquid crystal cell 100 and the positive C plate 50, for example. Alternatively, the other retardation film 70 may be arranged on each side of the liquid crystal cell 100. In the examples shown in the figures, only one other retardation film 70 is arranged between the liquid crystal cell 100 and the second polarizer 60, but two other retardation films 70 may be arranged therebetween. Further, one or more other retardation films 70 may be arranged on each side of the liquid crystal cell. In the case where two or more other retardation films are used, the retardation films may be identical to or different from each other.

Figure 8:
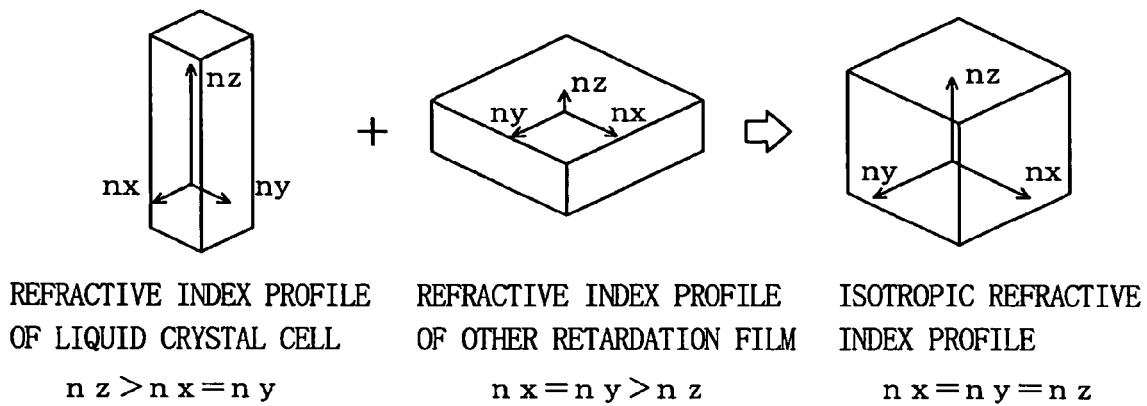
[FIG. 8] A typical conceptual diagram explaining a method of cancelling retardation values of a liquid crystal cell by using another retardation film.

The other retardation film 70 is preferably used for optically compensating and cancelling the retardation values of the liquid crystal cell 100. FIG. 8 is a typical conceptual diagram explaining a method of cancelling the retardation values of the liquid crystal cell by using the other retardation film. In the specification of the present invention, the phrase "cancelling the retardation values of the liquid crystal cell" refers to optically compensating the retardation values such that a laminate of the liquid crystal cell and the other retardation film substantially has an isotropic refractive index profile of nx=ny=nz. As shown in FIG. 8, for cancelling the retardation values of the liquid crystal cell having a refractive index profile of nz>nx=ny (typically, a liquid crystal cell of drive mode such as TN mode, OCB mode, or HAN mode), another retardation film having a refractive index profile of nx=ny>nz is preferably arranged such that the slow axes of the liquid crystal cell and the other retardation film are perpendicular to each other. Note that only a case of the liquid crystal cell having a refractive index profile of nz>nx=ny was shown in the example of the figure for simplicity, but the present invention may obviously be applied to a liquid crystal cell having a refractive index profile of nz>nx>ny or a liquid crystal cell having a refractive index profile of nx>ny=nz by using another retardation film having an appropriate refractive index profile.

Any appropriate material may be selected as a material used for forming the other retardation film. A material having excellent transparency, mechanical strength, heat stability, water barrier property, and the like is preferably used. Specific examples thereof include: a stretched film of a polymer film containing as a main component a thermoplastic resin; and an optical film containing a liquid crystal compound aligned in appropriate alignment and solidified or cured. Note that appropriate retardation values are set for the retardation values of the other retardation film in accordance with the refractive index profile (eventually, the retardation values) of the liquid crystal cell.

I. Overview of Liquid Crystal Display Apparatus of the Present Invention

Figure 9:
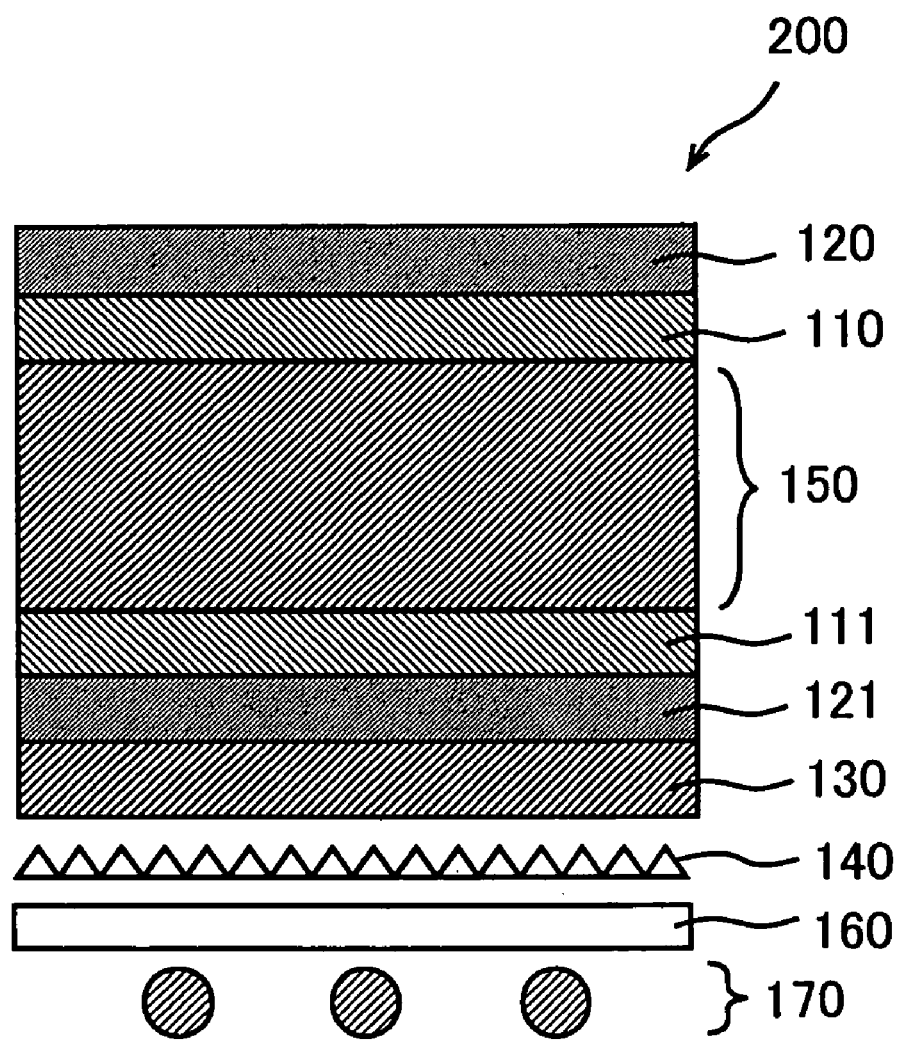
[FIG. 9] A schematic sectional view of a liquid crystal display apparatus according to a preferred embodiment of the present invention.

FIG. 9 is a schematic sectional view of a liquid crystal display apparatus according to a preferred embodiment of the present invention. A liquid crystal display apparatus 200 is provided with: a liquid crystal panel 150; protective layers 110 and 111 arranged on both sides of the liquid crystal panel; surface treated layers 120 and 121 arranged on outer sides of the protective layers 110 and 111; and a brightness enhancement film 130, a prism sheet 140, a light guide plate 160, and backlight 170 arranged on an outer side (backlight side) of the surface treated layer 121. Treated layers subjected to hard coat treatment, antireflection treatment, anti-sticking treatment, diffusion treatment (also referred to as anti-glare treatment), or the like is used as the surface treated layers 120 and 121. A polarization separation film having a polarization selection layer "D-BEF series" (trade name, available from Sumitomo 3M Limited, for example) or the like is used as the brightness enhancement film 130. The above-described optical members are used, to thereby obtain a display apparatus having better display properties. According to another embodiment, the optical members shown in FIG. 9 may be partly omitted or replaced by other members in accordance with the drive mode or application of the liquid crystal cell to be used as long as the effects of the present invention are obtained.

The liquid crystal display apparatus provided with the liquid crystal panel of the present invention has a contrast ratio (YW/YB) of preferably 10 or more, more preferably 12 or more, particularly preferably 20 or more, and most preferably 50 or more at an azimuth angle of 45° and a polar angle of 60°.

The liquid crystal display apparatus provided with the liquid crystal panel of the present invention has a color shift ($\Delta xy$ value) of preferably 1 or less, more preferably 0.7 or less, particularly preferably 0.6 or less, and most preferably 0.5 or less at an azimuth angle of 45° and a polar angle of 60°, in addition to the above-described contrast ratio.

J. Application of Liquid Crystal Panel and Liquid Crystal Display Apparatus of the Present Invention The application of the liquid crystal panel and liquid crystal display apparatus of the present invention is not particularly limited, but the liquid crystal panel and liquid crystal display apparatus of the present invention may be used for various applications such as: office automation (OA) devices such as a personal computer monitor, a laptop personal computer, and a copying machine; portable devices such as a cellular phone, a watch, a digital camera, a personal digital assistance (PDA), and a portable game machine; home appliances such as a video camera, a liquid crystal television, and a microwave; in-car devices such as a back monitor, a car navigation system monitor, and a car audio; display devices such as a commercial information monitor; security devices such as a surveillance monitor; and nursing care/medical devices such as a nursing monitor and a medical monitor.

In particular, the liquid crystal panel and liquid crystal display apparatus of the present invention are preferably used for a large liquid crystal television. A liquid crystal television employing the liquid crystal panel and liquid crystal display apparatus of the present invention has a screen size of preferably wide 17-inch (373 mm×224 mm) or more, more preferably wide 23-inch (499 mm×300 mm) or more, particularly preferably wide 26-inch (566 mm×339 mm) or more, and most preferably wide 32-inch (687 mm×412 mm) or more.

EXAMPLE

The present invention will be described in more detail by using the following examples and comparative examples. However, the present invention is not limited to the examples. Analysis methods used in the examples are described below.

(1) Method of Determining Single Axis Transmittance and Degree of Polarization:

The single axis transmittance and degree of polarization were determined at 23° C. by using a spectrophotometer "DOT-3" (trade name, manufactured by Murakami Color Research Laboratory).

(2) Method of Determining Molecular Weight:

The molecular weight was calculated through gel permeation chromatography (GPC) by using polystyrene as a standard sample. To be specific, the molecular weight was determined under the following measurement conditions by using the following apparatus and instruments.

Analyzer: "HLC-8120GPC", manufactured by Tosoh Corporation
  Column: TSKgel SuperHM-H/H4000/H3000/H2000
  Column size: 6.0 mm I.D.×150 mm
  Eluant: tetrahydrofuran
  Flow rate: 0.6 ml/minute
  Detector: RI
  Column temperature: 40° C.
  Injection amount: 20 μl (3) Method of Measuring Thickness:

A thickness of less than 10 μm was measured by using a thin film thickness spectrophotometer "Multichannel photodetector MCPD-2000" (trade name, manufactured by Otsuka Electronics Co., Ltd.). A thickness of 10 μm or more was measured by using a digital micrometer "KC-351C-type" (trade name, manufactured by Anritsu Corporation).

(4) Method of Determining Retardation Values (Re, Rth):

The retardation values were determined by using an automatic birefringence analyzer "KOBRA-21ADH" (trade name, manufactured by Oji Scientific Instruments) based on a parallel Nicol rotation method by using light of a wavelength of 590 nm at 23° C. Light of a wavelength of 480 nm was also used for wavelength dispersion measurement.

(5) Method of Measuring Refractive Index of Film:

The refractive index of the film was determined by measuring refractive indices by using an Abbe refractometer "DR-M4" (trade name, manufactured by Atago Co., Ltd.) by using light of a wavelength of 589 nm at 23° C.

(6) Method of Measuring Transmittance:

The transmittance was measured by using a UV-vis spectrophotometer "V-560" (trade name, manufactured by JASCO Corporation) by using light of a wavelength of 590 nm at 23° C.

(7) Method of Determining Photoelastic Coefficient:

The retardation values (23° C./wavelength of 590 nm) at a center of a sample having a size of 2 cm×10 cm were determined under stress (5 to 15 N) by using a spectroscopic ellipsometer "M-220" (trade name, manufactured by JASCO Corporation) while both ends of the sample were held, and the photoelastic coefficient was calculated from a slope of a function of the stress and the retardation values.

(8) UV Irradiation Method:

A UV irradiation apparatus having a metal halide lamp with a light intensity of 120 mW/cm$^2$ at a wavelength of 365 nm as a light source was used.

(9-1) Method of Determining Contrast Ratio of Liquid Crystal Display Apparatus:

After backlight was turned on in a dark room at 23° C. for a predetermined period of time, measurement of a contrast ratio was performed by using the following method and measurement apparatus. A white image and a black image were displayed on a liquid crystal display apparatus, and Y values of an XYZ display system at an azimuth angle of 45° and polar angle of 60° of a display screen were measured by using "EZ Contrast 160D" (trade name, manufactured by ELDIM SA). A contrast ratio "YW/YB" in an oblique direction was calculated from a Y value (YW) of the white image and a Y value (YB) of the black image. Note that, the azimuth angle of 45° refers to a direction rotated by 45° in a counter clockwise direction with respect to a longer side of the panel at 0°. The polar angle of 60° refers to a direction inclined by 60° with respect to a normal line direction of the display screen at 0°.

(9-2) Method of Measuring Light Leak of Liquid Crystal Display Apparatus:

After light was turned on in a dark room at 23° C. for 30 minutes, a tristimulus Y value defined in a CIE1931 XYZ display system of a screen displaying a black image was measured at an azimuth angle of 0 to 360° and a polar angle 60° by using "EZ Contrast 160D" (trade name, manufactured by ELDIM SA).

(10-1) Method of Measuring Color Shift (Δxy Value) of Liquid Crystal Display Apparatus:

After backlight was turned on in a dark room at 23° C. for a predetermined period of time, measurement of a color shift was performed through a method described below by using a measuring device described below. A black image was displayed on a liquid crystal display apparatus, and an x value and a y value in an XYZ color system were measured at an azimuth angle of 45° and a polar angle 60° by using "EZ Contrast 160D" (trade name, manufactured by ELDIM SA). A color shift in an oblique direction (Δxy value) was calculated from an expression $\{(x-0.31)^2+(y-0.31)^2\}^{1/2}$. The azimuth angle of 45° refers to a direction rotated counter clockwise by 45° with respect to a long side of a panel as 0°. The polar angle of 60° C. refers to a direction seen obliquely from 60° with respect to a direction vertical to a panel as 0°.

(10-2) Method of Measuring Color Shift (ΔE) of Liquid Crystal Display Apparatus:

After backlight was turned on in a dark room at 23° C. for a predetermined period of time (30 minutes in the specification of the present invention), measurement of a color shift was performed. A black image was displayed on a liquid crystal display apparatus, and a brightness L* and color coordinates a* and b* defined in a CIE1976 L*a*b* color space were measured at an azimuth angle of 0 to 3600 and a polar angle 60° by using "EZ Contrast 160D" (trade name, manufactured by ELDIM SA). A color shift in an oblique direction (ΔE) was calculated from an expression $\{(L^*)^2+(a^*)^2+(b^*)^2\}^{1/2}$.

<Production of Retardation Film to Be Used for Negative C Plate>

Reference Example 1

A polymer film containing as a main component triacetyl cellulose ["Fujitac", trade name, manufactured by Fuji Photo Film, Co., Ltd. (thickness of 80 μm, average refractive index of 1.48)] was used as a retardation film A-1. Table 1 shows properties of the retardation film A-1 together with the properties of films of Reference Examples 2 to 4 described below.

TABLE 1

|  | Reference Example 1 | Reference Example 2 | Reference Example 3 | Reference Example 4 |
|---|---|---|---|---|
| Retardation film | A-1 | A-2 | A-3 | A-4 |
| Thickness (μm) | 80 | 1.5 | 3.8 | 40 |
| Transmittance (%) | 90 | 91 | 91 | 91 |
| Re[590] (nm) | 1 | 1 | 2 | 1 |
| Rth[590] (nm) | 52 | 103 | 151 | 40 |

Reference Example 2

90 parts by weight of a calamitic liquid crystal compound having two polymerizable functional groups in a part of a molecular structure ["Paliocolor LC242", trade name, manufactured by BASF Aktiengesellschaft (ne=1.654, no=1.523)], 10 parts by weight of a polymerizable chiral agent ["Paliocolor LC756", trade name, manufactured by BASF Aktiengesellschaft], and 5 parts by weight of a photopolymerization initiator ["Irgacure 907", trade name, manufactured by Ciba Specialty Chemicals] were dissolved in 300 parts by weight of cyclopentanone, to thereby prepare a solution of a liquid crystal composition having a total solid content of 26 wt %. The solution of the liquid crystal composition was applied uniformly to a surface of a commercially available polyethylene terephthalate film ["Lumirror S27-E", trade name, manufactured by Toray Industries, Inc. (thickness of 75 μm)], and the whole was dried in an air-circulating thermostatic oven at 70° C.±1° C. for 5 minutes, to thereby obtain a solidified layer of a liquid crystal composition containing a liquid crystal compound in planar alignment. Then, this solidified layer was irradiated with UV rays of 600 mJ/cm² (under an air atmosphere), to thereby cure the liquid crystal composition through a polymerization reaction. The polyethylene terephthalate film was peeled off, to thereby obtain a cured layer of a liquid crystal composition containing a liquid crystal compound in planar alignment and having a thickness of 1.5 μm. The thus-obtained cured layer was referred to as a retardation film A-2. Table 1 shows the properties of the retardation film A-2.

Reference Example 3

17.7 parts by weight of a polyimide (weight average molecular weight of 124,000, average refractive index of 1.55, imidation rate of 99%) obtained through a reaction of 2,2'-bis(3,4-dicarboxyphenyl)hexafluoropropionic dianhydride (20 mmol) and 2,2-bis(trifluoromethyl)-4,4'-diaminobiphenyl (20 mmol) through a normal method was dissolved in 100 parts by weight of methyl isobutyl ketone, to thereby prepare a polyimide solution having a total solid content of 15 wt %. This polyimide solution was applied uniformly to a surface of a commercially available polyethylene terephthalate film ["Lumirror S27-E", trade name, manufactured by Toray Industries, Inc. (thickness of 75 μm)], and the whole was dried in an air-circulating thermostatic oven at 135° C.±1° C. for 5 minutes and then in an air-circulating thermostatic oven at 150° C.±1° C. for 10 minutes, to thereby evaporate the solvent. The polyethylene terephthalate film was peeled off, to thereby obtain a polymer film (residual volatile component of 2%) containing as a main component a polyimide and having a thickness of 3.8 μm. This polymer film was referred to as a retardation film A-3, and Table 1 shows the properties of the retardation film A-3.

Reference Example 4

A polymer film containing as a main component triacetyl cellulose ["Fujitac UZ", trade name, manufactured by Fuji Photo Film, Co., Ltd. (thickness of 40 μm, average refractive index of 1.48)] was referred to as a retardation film A-4. Table 1 shows the properties of the retardation film A-4.

<Production of Retardation Film to be Used for Positive A Plate>

Reference Example 5

70 parts by weight of a cycloolefin-based resin obtained through hydrogenation of a ring-opened polymer of a norbornene-based monomer ["Arton", trade name, manufactured by JSR Corporation (glass transition temperature of 171° C., weight average molecular weight of 130,000)] and 30 parts by weight of a styrene/maleic anhydride copolymer [manufactured by Sigma-Aldrich Japan K.K. (glass transition temperature of 120° C., weight average molecular weight of 224,000)] were dissolved in 300 parts of toluene, to thereby prepare a solution of a resin composition having a total solid content of 25 wt %. This solution was applied uniformly to a surface of a commercially available polyethylene terephthalate film ["Lumirror S27-E", trade name, manufactured by Toray Industries, Inc. (thickness of 75 μm)], and the whole was dried in an air-circulating thermostatic oven at 135° C.±1° C. for 5 minutes and then in an air-circulating thermostatic oven at 150° C.±1° C. for 10 minutes, to thereby evaporate the solvent. The polyethylene terephthalate film was peeled off, to thereby obtain a polymer film (Re[590] of 3 nm, Rth[590] of 4 nm, average refractive index of 1.52)) containing as a main component a resin composition containing a styrene/maleic anhydride copolymer and a cycloolefin-based resin obtained through hydrogenation of a ring-opened polymer of a norbornene-based monomer and having a thickness of 83 μm. This polymer film was stretched 1.2 times in one direction (vertical uniaxial stretching) in an air-circulating thermostatic oven at 120° C.±1° C. by using a biaxial stretching machine while a longitudinal direction of the polymer film alone was fixed. The obtained stretched film was referred to as a retardation film B-1. Table 2 shows the properties of the retardation film B-1 together with the properties of films of Reference Examples 6 to 10 described below.

Reference Example 6

A retardation film B-2 was produced in the same manner as in Reference Example 5 except that the stretching ratio was changed to 1.35 times. Table 2 shows the properties of the retardation film B-2.

Reference Example 7

A retardation film B-3 was produced in the same manner as in Reference Example 5 except that: the stretching temperature was changed to 150° C.; and the stretching ratio was changed to 1.5 times. Table 2 shows the properties of the retardation film B-3.

Reference Example 8

A film of a resin obtained through hydrogenation of a ring-opened polymer of a norbornene-based monomer ["Zeonor ZF14", trade name, manufactured by Optes Inc. (thickness of 60 μm, Tg=136° C.)] was stretched 1.19 times in a longitudinal direction by using a roll stretching machine in an air-circulating oven at 140° C., to thereby produce a retardation film B-4. Table 2 shows the properties of the retardation film B-4.

Reference Example 9

A retardation film B-5 was produced in the same manner as in Reference Example 8 except that the stretching ratio was changed to 1.24 times. Table 2 shows the properties of the retardation film B-5.

Reference Example 10

A retardation film B-6 was produced in the same manner as in Reference Example 8 except that the stretching ratio was changed to 1.27 times. Table 2 shows the properties of the retardation film B-6.

<Production of Retardation Film to be Used for Positive C Plate>

Reference Example 11

An ethyl silicate solution [available from Colcoat Co., Ltd. (a mixed solution of ethyl acetate and isopropyl alcohol, 2 wt %)] was applied to a commercially available polyethylene terephthalate film ["S-27E", trade name, manufactured by Toray Industries, Inc. (thickness of 75 μm)] by using a gravure coater, and the whole was dried in an air-circulating thermostatic oven at 130°±1° C. for 1 minute, to thereby form a glassy polymer film having a thickness of 0.1 μm on a surface of the polyethylene terephthalate film.

Next, 5 parts by weight of polymer liquid crystals represented by the below-indicated formula (II) (weight average molecular weight of 5,000), 20 parts by weight of a calamitic liquid crystal compound having two polymerizable functional groups in a part of a molecular structure ["Paliocolor

TABLE 2

|  | Reference example 5 | Reference example 6 | Reference example 7 | Reference example 8 | Reference example 9 | Reference example 10 |
|---|---|---|---|---|---|---|
| Retardation film | B-1 | B-2 | B-3 | B-4 | B-5 | B-6 |
| Thickness (μm) | 68 | 64 | 54 | 55 | 55 | 55 |
| Transmittance (%) | 90 | 90 | 90 | 90 | 90 | 90 |
| Re[480] (nm) | 78 | 95 | 134 | 95 | 106 | 119 |
| Re[590] (nm) | 82 | 100 | 141 | 94 | 105 | 118 |
| Rth[590] (nm) | 82 | 101 | 141 | 94 | 105 | 118 |
| Re[480]/Re[590] | 0.95 | 0.95 | 0.95 | 1.01 | 1.01 | 1.01 |
| C[590] × $10^{-12}$ (m$^2$/N) | 9.9 | 9.9 | 9.9 | 3.1 | 3.1 | 3.1 |

LC242", trade name, manufactured by BASF Aktiengesellschaft (ne=1.654, no=1.523)], and 1.25 parts by weight of a photopolymerization initiator ["Irgacure 907", trade name, manufactured by Ciba Specialty Chemicals] were dissolved in 75 parts by weight of cyclohexanone, to thereby prepare a solution of a liquid crystal composition. This solution was applied onto the glassy polymer film of the polyethylene terephthalate film by using a rod coater, and the whole was dried in an air-circulating thermostatic oven at 80° C.±1° C. for 2 minutes and gradually cooled to room temperature (23° C.), to thereby form a solidified layer of a liquid crystal composition in homeotropic alignment on a surface of the polyethylene terephthalate film. Then, this solidified layer was irradiated with UV rays of 400 mJ/cm$^2$ under an air atmosphere, to thereby cure the liquid crystal composition through a polymerization reaction. The polyethylene terephthalate film was peeled off, to thereby obtain a cured layer of a liquid crystal composition in homeotropic alignment having a thickness of 0.5 μm. The cured layer was referred to as a retardation film C-1. Table shows properties of the retardation film C-1 together with the properties of films of Reference Examples 12 to 17 described below.

the solution of a liquid crystal composition was changed. Table 3 shows the properties of the retardation film C-4.

Reference Example 15

A solution of a liquid crystal composition was prepared in the same manner as in Reference Example 11. This solution was applied to a surface of a commercially available polymer film containing as a main component a norbornene-based resin ["Zeonor ZF14", trade name, manufactured by Optes Inc. (thickness of 100 μm)] by using a die coater, and the whole was dried in an air-circulating thermostatic oven at 80° C.±1° C. for 2 minutes and gradually cooled to room temperature (23° C.), to thereby form a solidified layer of a liquid crystal composition in homeotropic alignment on a surface of the polymer film. Then, this solidified layer was irradiated with UV rays of 400 mJ/cm$^2$ under an air atmosphere, to thereby cure the liquid crystal composition through a polymerization reaction. The polymer film was peeled off, to thereby obtain a cured layer of a liquid crystal composition

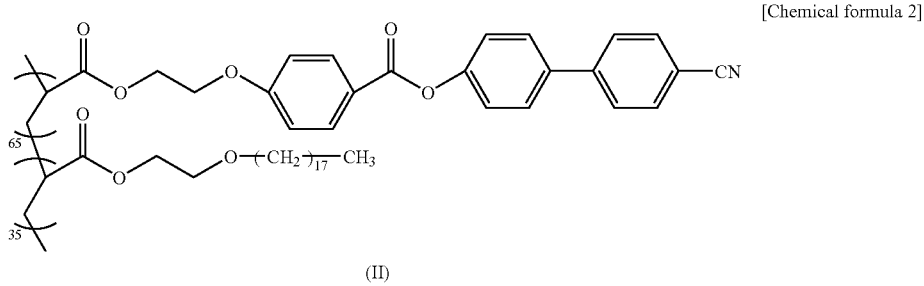

[Chemical formula 2]

(II)

TABLE 3

| | Reference example 11 | Reference example 12 | Reference example 13 | Reference example 14 | Reference example 15 | Reference example 16 | Reference example 17 |
|---|---|---|---|---|---|---|---|
| Retardation film | C-1 | C-2 | C-3 | C-4 | C-5 | C-6 | C-7 |
| Thickness (μm) | 0.5 | 1.0 | 1.9 | 2.5 | 0.8 | 1.0 | 1.2 |
| Transmittance (%) | 91 | 91 | 91 | 91 | 91 | 91 | 91 |
| Re[590] (nm) | 1 | 1 | 1 | 1 | 1 | 1 | 1 |
| Rth[590] (nm) | −50 | −101 | −185 | −250 | −80 | −100 | −120 |

Reference Example 12

A retardation film C-2 was produced in the same manner as in Reference Example 11 except that the applied thickness of the solution of a liquid crystal composition was changed. Table 3 shows the properties of the retardation film C-2.

Reference Example 13

A retardation film C-3 was produced in the same manner as in Reference Example 11 except that the applied thickness of the solution of a liquid crystal composition was changed. Table 3 shows the properties of the retardation film C-3.

Reference Example 14

A retardation film C-4 was produced in the same manner as in Reference Example 11 except that the applied thickness of containing a calamitic liquid crystal compound in homeotropic alignment. The cured layer was referred to as a retardation film C-5. Table 3 shows properties of the retardation film C-5.

Reference Example 16

A retardation film C-6 was produced in the same manner as in Reference Example 15 except that the applied thickness of the solution of a liquid crystal composition was changed. Table 3 shows the properties of the retardation film C-6.

Reference Example 17

A retardation film C-7 was produced in the same manner as in Reference Example 15 except that the applied thickness of the solution of a liquid crystal composition was changed. Table 3 shows the properties of the retardation film C-7.

<Production of Isotropic Film>

Reference Example 18

65 parts by weight of an alternating copolymer of isobutylene and N-methylmaleimide (N-methylmaleimide content of 50 mol % and glass transition temperature of 157° C.), 35 parts by weight of an acrylonitrile/styrene copolymer (acrylonitrile content of 27 mol %), and 1 part by weight of 2-[4, 6-diphenyl-1,3,5-triazin-2-yl]-5-[(hexyl)oxy]-phenol (UV absorber) were formed into pellets by using an extruder. Then, the resultant was dried at 100° C. for 5 hours and extruded at 270° C. by using a single-screw extruder of 40 nmΦ and a T-die of 400 mm width, and a sheet-like molten resin was cooled by using a cooling drum, to thereby produce a polymer film X having a width of about 600 mm and a thickness of 40 μm. The polymer film X had Re[590] of 1 nm, Rth[590] of 2 nm, transparency of 90%, and an absolute value of a photoelastic coefficient of $5.1\times10^{-12}$ (m$^2$/N).

Reference Example 19

A commercially available polymer film containing as a main component a cellulose-based resin ["Fujitac ZRF80S", trade name, manufactured by Fuji Photo Film, Co., Ltd.] was used as it is. This polymer film was referred to as an optical film Y. The optical film Y had Re[590]=0 nm and Rth[590]=2 nm and had substantially optical isotropic property.

<Production of Polarizer>

Reference Example 20

A polymer film containing polyvinyl alcohol as a main component ["9P75R", trade name, manufactured by Kuraray Co., Ltd., thickness of 75 μm, average degree of polymerization of 2,400, degree of saponification of 99.9 mol %] was uniaxially stretched 2.5 times by using a roll stretching machine while the polymer film was colored in a coloring bath maintained at 30° C.±3° C. and containing iodine and potassium iodide. Next, the polymer film was uniaxially stretched to a 6 times length of the original length of the polyvinyl alcohol film in an aqueous solution maintained at 60° C.±3° C. and containing boric acid and potassium iodide while a crosslinking reaction was performed. The obtained film was dried in an air circulating thermostatic oven at 50° C.±1° C. for 30 minutes, to thereby obtain polarizers P1 and P2 each having a moisture content of 23%, a thickness of 28 μm, a degree of polarization of 99.9%, and a single axis transmittance of 43.5%.

<Production of Other Polarizing Element>

Reference Example 21

To each side of the polarizer P2 obtained in Reference Example 20, the polymer film X obtained in Reference Example 18 was laminated through an adhesive layer formed of an isocyanate-based adhesive "Takenate 631", trade name, manufactured by Mitsui Takeda Chemicals, and having a thickness of 5 μm, to thereby produce a polarizing element (X).

Reference Example 22

To each side of the polarizer P2 obtained in Reference Example 20, the optical film Y obtained in Reference Example 19 was laminated through an adhesive layer formed of an isocyanate-based adhesive "Takenate 631", trade name, manufactured by Mitsui Takeda Chemicals, and having a thickness of 5 μm, to thereby produce a polarizing element (Y).

<Production of Liquid Crystal Cell of IPS Mode>

Reference Example 23

A liquid crystal panel was taken out of a liquid crystal display apparatus including a liquid crystal cell of IPS mode ["KLV-17HR2", manufactured by Sony Corporation]. All optical films arranged above and below the liquid crystal cell were removed, and glass surfaces (front and back surfaces) of the liquid crystal cell were washed. The thus-produced liquid crystal cell was referred to as a liquid crystal cell A.

Reference Example 24

A liquid crystal panel was taken out of a liquid crystal display apparatus including a liquid crystal cell of IPS mode [the 32V type liquid crystal television "FACE", trade name, manufactured by TOSHIBA CORPORATION, type number: 32LC100, screen size: 697 mm×392 mm]. All optical films arranged above and below the liquid crystal cell were removed, and glass surfaces (front and back surfaces) of the liquid crystal cell were washed. The thus-produced liquid crystal cell was referred to as a liquid crystal cell B.

Example 1

On a surface of one side of the polarizer P1 obtained in Reference Example 20, the polymer film X obtained in Reference Example 18 was laminated through an adhesive layer formed of an isocyanate-based adhesive ["Takenate 631", trade name, manufactured by Mitsui Takeda Chemicals, Inc.] and having a thickness of 5 μm. On a surface of another side of the polarizer P1, the retardation film A-1 (negative C plate) was laminated through an adhesive layer formed of an isocyanate-based adhesive ["Takenate 631", tradename, manufactured by Mitsui Takeda Chemicals, Inc.] and having a thickness of 5 μm such that a slow axis of the retardation film A-1 was substantially parallel (0°±0.5°) to an absorption axis of the polarizer P1. On a surface of the retardation film A-1, the retardation film B-2 (positive A plate) was laminated through an adhesive layer formed of an acrylic pressure-sensitive adhesive and having a thickness of 20 μm such that a slow axis of the retardation film B-2 was substantially perpendicular (90°±0.5°) to the absorption axis of the polarizer P1. Then, on a surface of the retardation film B-2, the retardation film C-2 (positive C plate) was laminated through an adhesive layer formed of an acrylic pressure-sensitive adhesive and having a thickness of 20 μm such that a slow axis of the retardation film C-2 was substantially parallel (0°±0.5°) to the absorption axis of polarizer P1, to thereby produce a polarizing element (i).

Next, on a surface of a viewer side of the liquid cell A of IPS mode obtained in Reference Example 23, the polarizing element (i) was laminated through an adhesive layer formed of an acrylic pressure-sensitive adhesive and having a thickness of 20 μm such that the absorption axis of the polarizer P1 was substantially parallel (0°±0.5°) to a long side of the liquid crystal cell and the retardation films faced the liquid crystal cell. At this time, the absorption axis of the polarizer P1 was substantially perpendicular to an initial alignment direction of the liquid crystal cell. On a backlight side of the liquid crystal cell of IPS mode, the polarizing element (X) obtained in Reference Example 21 was laminated through an adhesive layer formed of an acrylic pressure-sensitive adhesive and having a thickness of 20 μm such that the absorption axis of the polarizer P2 was substantially parallel (0°±0.5°) to a short side of the liquid crystal cell. At this time, the absorption axes of the polarizers P1 and P2 were perpendicular to each other.

The thus-produced liquid crystal panel (i) has a structure shown in FIG. 2(a). This liquid crystal panel (i) was connected to a backlight unit, to thereby produce a liquid crystal display apparatus (i). After backlight was turned on for 30 minutes, a contrast ratio in an oblique direction and a color shift in an oblique direction were measured. Table 4 shows the obtained properties together with data of Examples 2 to 4 and Comparative Example 1 and 2.

Next, on a surface of a viewer side of the liquid cell of IPS mode obtained in Reference Example 23, the polarizing element (iii) was laminated through an adhesive layer formed of an acrylic pressure-sensitive adhesive and having a thickness of 20 μm such that the absorption axis of the polarizer P1 was substantially parallel (0°±0.5°) to a long side of the liquid crystal cell and the retardation films faced the liquid crystal cell. Also, on a backlight side of the liquid crystal cell of IPS mode, the polarizing element (X) obtained in Reference Example 21 was laminated through an adhesive layer formed of an acrylic pressure-sensitive adhesive and having a thickness of 20 μm such that the absorption axis of the polarizer P2 was substantially parallel (0°±0.5°) to a short side of the

TABLE 4

| | Negative C plate | | Positive A plate | | Positive C plate | | | Liquid crystal panel | |
| --- | --- | --- | --- | --- | --- | --- | --- | --- | --- |
| | Retardation film | Rth[590] (nm) | Retardation film | Re[590] (nm) | Retardation film | Rth[590] (nm) | Construction | Contrast ratio in oblique direction | Color shift in oblique direction (Δxy) |
| Example 1 | A-1 | 52 | B-2 | 100 | C-2 | −101 | FIG. 2(a) | 71.5 | 0.33 |
| Example 2 | A-2 | 103 | B-1 | 82 | C-2 | −101 | FIG. 2(a) | 10.1 | 0.47 |
| Example 3 | A-2 | 103 | B-3 | 141 | C-3 | −185 | FIG. 2(b) | 25.1 | 0.57 |
| Example 4 | A-3 | 151 | B-3 | 141 | C-4 | −250 | FIG. 2(b) | 14.8 | 0.61 |
| Comparative Example 1 | A-1 | 52 | B-2 | 100 | C-1 | −50 | FIG. 2(a) | 2.9 | 0.50 |
| Comparative Example 2 | A-1 | 52 | B-3 | 141 | C-1 | −50 | FIG. 2(b) | 5.5 | 0.54 |

Example 2

A liquid crystal panel (ii) and a liquid crystal display apparatus (ii) were produced in the same manner as in Example 1 except that: the retardation A-2 was used as the negative C plate; and the retardation film B-1 was used as the positive A plate. Table 4 shows the properties of the liquid crystal display apparatus (ii).

Example 3

On a surface of one side of the polarizer P1 obtained in Reference Example 20, the polymer film X obtained in Reference Example 18 was laminated through an adhesive layer formed of an isocyanate-based adhesive ["Takenate 631", trade name, manufactured by Mitsui Takeda Chemicals, Inc.] and having a thickness of 5 μm. Next, on a surface of another side of the polarizer P1, the retardation film B-3 (positive A plate) was laminated through an adhesive layer formed of an isocyanate-based adhesive ["Takenate 631", trade name, manufactured by Mitsui Takeda Chemicals, Inc.] and having a thickness of 5 μm such that a slow axis of the retardation film B-3 was substantially perpendicular (90°±0.5°) to an absorption axis of the polarizer P1. On a surface of the retardation film B-3, the retardation film C-3 (positive C plate) was laminated through an adhesive layer formed of an acrylic pressure-sensitive adhesive and having a thickness of 20 μm such that a slow axis of the retardation film C-3 was substantially parallel (0°±0.5°) to the absorption axis of the polarizer P1. Further, on a surface of the retardation film C-3, the retardation film A-1 (negative C plate) was laminated through an adhesive layer formed of an acrylic pressure-sensitive adhesive and having a thickness of 20 μm such that a slow axis of the retardation film A-1 was substantially parallel (0°±0.5°) to the absorption axis of polarizer P1, to thereby produce a polarizing element (iii).

liquid crystal cell. At this time, the absorption axes of the polarizers P1 and P2 were perpendicular to each other.

The thus-produced liquid crystal panel (iii) has a structure shown in FIG. 2(b). This liquid crystal panel (iii) was connected to a backlight unit, to thereby produce a liquid crystal display apparatus (iii). Table 4 shows the properties of the liquid crystal display apparatus (iii).

Example 4

A liquid crystal panel (iv) and a liquid crystal display apparatus (iv) were produced in the same manner as in Example 3 except that: the retardation A-3 was used as the negative C plate; and the retardation film C-4 was used as the positive C plate. Table 4 shows the properties of the liquid crystal display apparatus (iv).

Comparative Example 1

A liquid crystal panel (p) and a liquid crystal display apparatus (p) were produced in the same manner as in Example 1 except that the retardation film C-1 was used as the positive C plate. Table 4 shows the properties of the liquid crystal display apparatus (p).

Comparative Example 2

A liquid crystal panel (q) and a liquid crystal display apparatus (q) were produced in the same manner as in Example 3 except that the retardation film C-1 was used as the positive C plate. Table 4 shows the properties of the liquid crystal display apparatus (q).

Example 5

On a surface of one side of the polarizer P1 obtained in Reference Example 20, the polymer film Y obtained in Reference Example 19 was laminated through an adhesive layer formed of an isocyanate-based adhesive ["Takenate 631", trade name, manufactured by Mitsui Takeda Chemicals, Inc.] and having a thickness of 5 μm. Next, on a surface of another side of the polarizer P1, the retardation film A-4 (negative C plate) was laminated through an adhesive layer formed of an isocyanate-based adhesive ["Takenate 631", trade name, manufactured by Mitsui Takeda Chemicals, Inc.] and having a thickness of 5 μm such that a slow axis of the retardation film A-4 was substantially parallel (0°±0.5°) to an absorption axis of the polarizer P1. Also, on a surface of the retardation film A-4, the retardation film B-4 (positive A plate) was laminated through an adhesive layer formed of an acrylic pressure-sensitive adhesive and having a thickness of 20 μm such that a slow axis of the retardation film B-4 was substantially perpendicular (90°±0.5°) to the absorption axis of the polarizer P1. Further, on a surface of the retardation film B-4, the retardation film C-5 (positive C plate) was laminated through an adhesive layer formed of an acrylic pressure-sensitive adhesive and having a thickness of 20 μm such that a slow axis of the retardation film C-5 was substantially parallel (0°±0.5°) to the absorption axis of polarizer P1, to thereby produce a polarizing element (v).

Next, on a surface of a viewer side of the liquid cell B of IPS mode obtained in Reference Example 24, the polarizing element (v) was laminated through an adhesive layer formed of an acrylic pressure-sensitive adhesive and having a thickness of 20 μm such that the absorption axis of the polarizer P1 was substantially parallel (0°±0.5°) to a long side of the liquid crystal cell and each retardation film faced the liquid crystal cell. At this time, the absorption axis of the polarizer P1 was substantially perpendicular to an initial alignment direction of the liquid crystal cell. Also, on a backlight side of the liquid crystal cell of IPS mode, the polarizing element (Y) obtained in Reference Example 22 was laminated through an adhesive layer formed of an acrylic pressure-sensitive adhesive and having a thickness of 20 μm such that the absorption axis of the polarizer P2 was substantially parallel (0°±0.5°) to a short side of the liquid crystal cell. At this time, the absorption axes of the polarizers P1 and P2 were perpendicular to each other.

The thus-produced liquid crystal panel (v) has a structure shown in FIG. 2(a). This liquid crystal panel (v) was connected to a backlight unit, to thereby produce a liquid crystal display apparatus (v). After backlight was turned on for 30 minutes, a contrast ratio in an oblique direction and a color shift in an oblique direction were measured. Table 5 shows the obtained properties together with data of Examples 6 to 11.

Example 6

Figure 10:
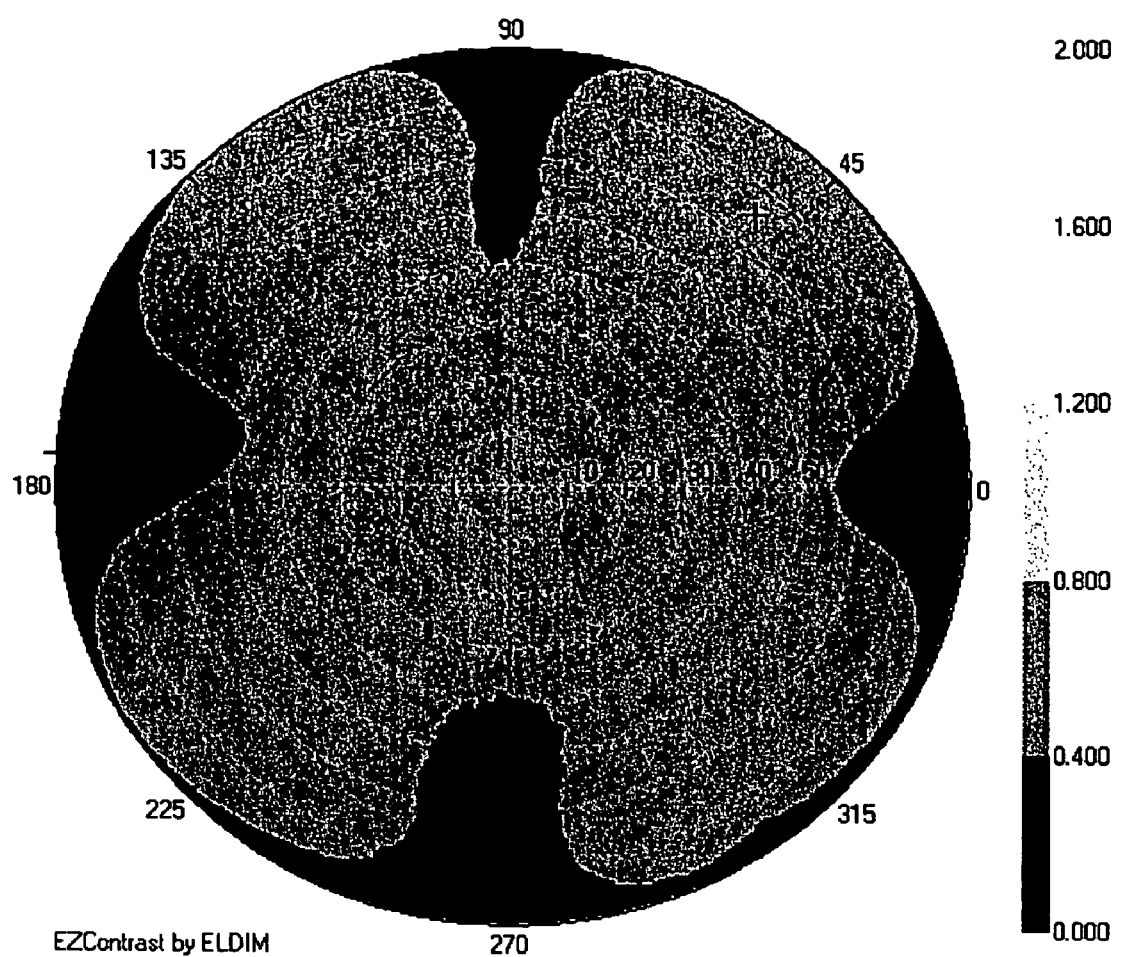
[FIG. 10] A brightness contour map of a liquid crystal display apparatus of Example 6.

A liquid crystal panel (vi) and a liquid crystal display apparatus (vi) were produced in the same manner as in Example 5 except that the retardation B-5 was used as the positive A plate. Table 5 shows the properties of the liquid crystal display apparatus (vi). Further, FIG. 10 shows a brightness contour map of this liquid crystal display apparatus.

Example 7

A liquid crystal panel (vii) and a liquid crystal display apparatus (vii) were produced in the same manner as in Example 5 except that the retardation film C-6 was used as the positive C plate. Table 5 shows the properties of the liquid crystal display apparatus (vii).

Example 8

Figure 11:
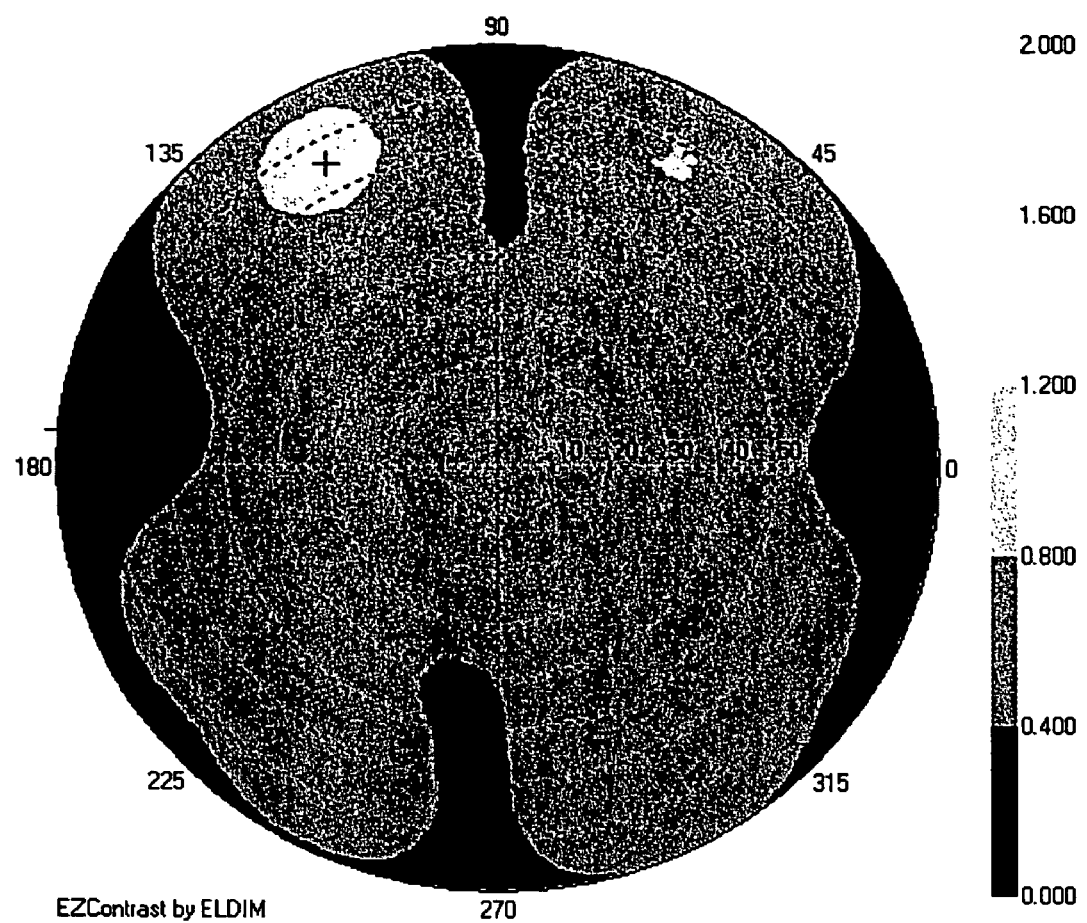
[FIG. 11] A brightness contour map of a liquid crystal display apparatus of Example 8.

A liquid crystal panel (viii) and a liquid crystal display apparatus (viii) were produced in the same manner as in Example 5 except that the retardation film B-5 was used as the positive A plate and the retardation film C-6 was used as the positive C plate. Table 5 shows the properties of the liquid crystal display apparatus (viii). FIG. 11 shows a brightness contour map of this liquid crystal display apparatus.

Example 9

A liquid crystal panel (ix) and a liquid crystal display apparatus (ix) were produced in the same manner as in Example 5 except that the retardation film B-6 was used as the positive A plate and the retardation film C-6 was used as the positive C plate. Table 5 shows the properties of the liquid crystal display apparatus (ix).

Example 10

A liquid crystal panel (x) and a liquid crystal display apparatus (x) were produced in the same manner as in Example 5 except that the retardation film C-7 was used as the positive C plate. Table 5 shows the properties of the liquid crystal display apparatus (x).

Example 11

A liquid crystal panel (xi) and a liquid crystal display apparatus (xi) were produced in the same manner as in

TABLE 5

| | Negative C plate | | Positive A plate | | Positive C plate | | Liquid crystal panel | | | | |
|---|---|---|---|---|---|---|---|---|---|---|---|
| | | | | | | | | Light leak in oblique direction (Y) | | Color shift in oblique direction (ΔE) | |
| | Retardation film | Rth[590] (nm) | Retardation film | Re[590] (nm) | Retardation film | Rth[590] (nm) | Structure | Average | Maximum | Average | Minimum |
| Example 5 | A-4 | 40 | B-4 | 94 | C-5 | −80 | FIG. 2(a) | 0.53 | 0.95 | 7.05 | 4.14 |
| Example 6 | A-4 | 40 | B-5 | 105 | C-5 | −80 | FIG. 2(a) | 0.53 | 0.77 | 7.79 | 4.33 |
| Example 7 | A-4 | 40 | B-4 | 94 | C-6 | −100 | FIG. 2(a) | 0.59 | 1.05 | 6.87 | 4.14 |
| Example 8 | A-4 | 40 | B-5 | 105 | C-6 | −100 | FIG. 2(a) | 0.53 | 0.85 | 8.43 | 4.22 |
| Example 9 | A-4 | 40 | B-6 | 118 | C-6 | −100 | FIG. 2(a) | 0.59 | 0.97 | 12.5 | 5.14 |
| Example 10 | A-4 | 40 | B-4 | 94 | C-7 | −120 | FIG. 2(a) | 0.83 | 1.64 | 9.50 | 4.42 |
| Example 11 | A-4 | 40 | B-5 | 105 | C-7 | −120 | FIG. 2(a) | 0.79 | 1.56 | 12.3 | 4.66 |

Example 5 except that the retardation film B-5 was used as the positive A plate and the retardation film C-7 was used as the positive C plate. Table 5 shows the properties of the liquid crystal display apparatus (xi).

As shown in each of Example 1 to 4, the liquid crystal panel provided with the polarizing element of the present invention (eventually, the liquid crystal display apparatus) had excellent display properties such as a high contrast ratio in an oblique direction and a small color shift ($\Delta xy$) in an oblique direction. On the other hand, as shown in each of Comparative Examples 1 and 2, the liquid crystal display apparatus provided with the polarizing element in which the retardation film to be used for the positive C plate had Rth[590] of more than −60 nm had a low contrast ratio in an oblique direction and did not satisfy a level required for practical use. As shown in Table 5 (Examples 5 to 11), the liquid crystal panel provided with the polarizing element of the present invention (eventually, the liquid crystal display apparatus) had favorable average and maximum light leak in an oblique direction and a favorable color shift ($\Delta E$) in an oblique direction. In addition, FIGS. 10 and 11 each reveal that the liquid crystal panel provided with the polarizing element of the present invention (eventually, the liquid crystal display apparatus) had little light leak in an oblique direction.

INDUSTRIAL APPLICABILITY

As described above, the polarizing element of the present invention is arranged on at least one side of the liquid crystal cell, to thereby increase a contrast ratio in an oblique direction and reduce a color shift in an oblique direction. Thus, the polarizing element is extremely useful for improving display properties of a liquid crystal display apparatus. The polarizing element of the present invention may suitable be used for a liquid crystal display apparatus and a liquid crystal television.

The invention claimed is:

1. A polarizing element comprising a polarizer, a negative C plate, a positive A plate, and a positive C plate each arranged on one side of the polarizer, wherein:
   the positive A plate is arranged between the polarizer and the positive C plate such that a slow axis of the positive A plate is substantially perpendicular to an absorption axis of the polarizer; and
   the positive C plate has $Rth_{PC}[590]$ of −60 nm or less.

2. A polarizing element according to claim 1, wherein the negative C plate has $Rth_{NC}[590]$ of 30 nm to 200 nm.

3. A polarizing element according to claim 1 or 2, wherein a sum of $Rth_{NC}[590]$ of the negative C plate and $Rth_{PC}[590]$ of the positive C plate is −150 nm to −30 nm.

4. A polarizing element according to claim 1 or 2, wherein the negative C plate comprises a polymer film containing as a main component at least one thermoplastic resin selected from the group consisting of a cellulose-based resin, a polyamideimide-based resin, a polyether ether ketone-based resin, and a polyimide-based resin.

5. A polarizing element according to claim 1 or 2, wherein the positive A plate has $Re_{PA}[590]$ of 60 nm to 180 nm.

6. A polarizing element according to claim 1 or 2, wherein the positive A plate comprises a stretched film of a polymer film containing a styrene-based resin.

7. A polarizing element according to claim 1 or 2, wherein the positive C plate comprises a solidified layer or cured layer of a liquid crystal composition containing a liquid crystal compound in homeotropic alignment.

8. A polarizing element according to claim 7, wherein the liquid crystal composition comprises a liquid crystal compound having at least one polymerizable functional group in a part of a molecular structure.

9. A polarizing element according to claim 7, wherein the solidified layer or cured layer of a liquid crystal composition containing a liquid crystal compound in homeotropic alignment has a thickness of 0.6 µm to 20 µm.

10. A liquid crystal panel comprising the polarizing element according to claim 1 or 2 and a liquid crystal cell.

11. A liquid crystal panel according to claim 10, wherein the liquid crystal cell comprises a liquid crystal layer containing nematic liquid crystals in homogeneous alignment in the absence of an electrical field.

12. A liquid crystal television comprising the liquid crystal panel according to claim 10.

13. A liquid crystal display apparatus comprising the liquid crystal panel according to claim 10.

* * * * *